US011985087B2

(12) United States Patent
Mikaelsson et al.

(10) Patent No.: US 11,985,087 B2
(45) Date of Patent: May 14, 2024

(54) METHODS, SYSTEMS AND ANTENNA REFERENCE POINTS OF A WIRELESS COMMUNICATION NETWORK FOR SYNCHRONIZING TRANSMISSION OF SIGNALS

(71) Applicant: Telefonaktiebolaget LM Ericsson (publ), Stockholm (SE)

(72) Inventors: Alexandra Mikaelsson, Tyresö (SE); Ari Kangas, Lidingö (SE); Avneesh Vyas, Sundbyberg (SE); Obada Alhaj Moussa, Spånga (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 389 days.

(21) Appl. No.: 17/603,033

(22) PCT Filed: Apr. 15, 2019

(86) PCT No.: PCT/SE2019/050346
§ 371 (c)(1),
(2) Date: Oct. 12, 2021

(87) PCT Pub. No.: WO2020/214069
PCT Pub. Date: Oct. 22, 2020

(65) Prior Publication Data
US 2022/0190976 A1  Jun. 16, 2022

(51) Int. Cl.
*H04L 5/00* (2006.01)
*H04B 7/26* (2006.01)
*H04W 56/00* (2009.01)

(52) U.S. Cl.
CPC .......... *H04L 5/005* (2013.01); *H04B 7/2643* (2013.01); *H04W 56/001* (2013.01)

(58) Field of Classification Search
CPC .... H04L 5/005; H04B 7/2643; H04W 56/001; H04W 56/0045
See application file for complete search history.

(56) References Cited

U.S. PATENT DOCUMENTS

2012/0214512 A1*  8/2012  Siomina .................. G01S 5/011
                                                        455/456.2
2017/0245228 A1   8/2017  Ruffini et al.
(Continued)

FOREIGN PATENT DOCUMENTS

WO        2020009622 A1     1/2020

OTHER PUBLICATIONS

International Search Report and the Written Opinion of the International Searching Authority, issued in corresponding International Application No. PCT/SE2019/050346, dated Dec. 17, 2019, 11 pages.

*Primary Examiner* — Kyaw Z Soe
(74) *Attorney, Agent, or Firm* — Rothwell, Figg, Ernst & Manbeck, P.C.

(57) ABSTRACT

Disclosed is a method for synchronizing transmission of signals from antenna reference points, ARP, (121, 122) of a wireless communication network (100). The method comprises initiating transmission of a first synchronization reference signal from a first ARP (121) at a first time point, instructing a second ARP (122) to determine a second time point for reception of the first synchronization reference signal, initiating transmission of a second synchronization reference signal from the second ARP (122) at a third time point, and instructing the first ARP to determine a fourth time point for reception of the second synchronization reference signal. The first and the second synchronization references signals are either transmitted in uplink communication resources available or they are transmitted in downlink communication resources. The method further com- (Continued)

prises initiating transmission of data from the first ARP (121) to wireless devices (130) at a time point determined based on the first, second, third and fourth time points.

40 Claims, 11 Drawing Sheets

(56) References Cited

U.S. PATENT DOCUMENTS

| | | |
|---|---|---|
| 2018/0310269 A1 | 10/2018 | Mayer |
| 2019/0068260 A1* | 2/2019 | Yan .................. H04B 7/0404 |
| 2019/0245589 A1* | 8/2019 | Xu .................... H04B 7/2643 |

* cited by examiner

METHODS, SYSTEMS AND ANTENNA REFERENCE POINTS OF A WIRELESS COMMUNICATION NETWORK FOR SYNCHRONIZING TRANSMISSION OF SIGNALS

CROSS REFERENCE TO RELATED APPLICATION(S)

This application is a 35 U.S.C. § 371 National Phase Entry Application from PCT/SE2019/050346, filed Apr. 15, 2019, designating the United States, the disclosure of which is incorporated herein by reference in its entirety.

TECHNICAL FIELD

The present disclosure relates generally to methods, systems and antenna reference points (ARP) of a wireless communication network for synchronizing transmission of signals from the ARPs. The present disclosure further relates to computer programs and carriers corresponding to the above methods, systems and ARPs.

BACKGROUND

Contemporary wireless communication networks such as Long Term Evolution (LTE), and future wireless networks based on 5G, such as New Radio (NR) are dependent on network synchronization, i.e. time alignment between radio access network nodes in the network. In practice, the key time alignment requirement applies at an antenna reference point (ARP) between radio access network nodes that serve contiguous or overlapping coverage areas. However, there are Timing Errors (TE) appearing for clocks of the radio access network nodes in the network towards a common reference time base (CRT), i.e. a global clock. The difference in time between radio access network nodes in the network is called a relative Time Error (rTE). There is a synchronization requirement specified between radio access network nodes called relative Time error specification (rTE_s). An example of rTE_s is specified in 3GPP TS36.133 section 7.4 release 15.2.0 as rTE<3 µs when operating TDD LTE services with cell radius <=3 km.

Network Synchronization implementations traditionally seek to minimize the rTE at the ARPs of all radio access network nodes in a network to the CRT, by continuously adjusting each radio access network node's clock to a local reference that has traceability to the CRT. The CRT may be e.g. GPS System Time. At each radio access network node, the local reference can be provided by a global navigation satellite system (GNSS) receiver that receives a CRT. Alternatively, a CRT is carried over the backhaul network, e.g. via a timing protocol such as Precision Time Protocol (PTP), to the radio access network nodes. Hence the direct network synchronization requirement between radio access network nodes (rTE_s) is achieved by regulating each radio access network node clock to be within error TE_s of the CRT. In order to define requirements of maximum acceptable time error, the derived relationship between TE_s and rTE_s is as follows: |TE_s|<|rTE_s|/2. This means that to achieve an rTE below for example 3 microseconds, the TE for each radio access network clock has to be less than 1.5 microseconds off the CRT.

FIG. 1 shows prior art time synchronization in a radio access network of a wireless communication network. FIG. 1 shows both providing CRT in the network via a GNSS satellite system and providing CRT via PTP. For providing CRT via GNSS, there is a number of GPS satellites 20 that provide the CRT to GNSS receivers 22, 24, 26 geographically spread in the communication network. The GNSS receivers 22, 24, 26 then provide the received CRT to radio access network nodes 32, 34, 36, 38 and further to the ARPs of the radio access network nodes 32, 34, 46, 38 for adjusting local clocks controlling the ARPs. For providing CRT via PTP, the CRT originates from a PTP grand master clock 40. The CRT is then distributed over a backbone network from the PTP grandmaster clock 40 to PTP boundary clocks 42, 43, 44, 45, 46, 47 distributed in the wireless communication network. The PTP boundary clocks are then connected to the radio access network nodes 32, 34, 36, 38 and the ARPs of the radio access network nodes.

Invariably, the radio access network nodes' internal clocks have some TE to the CRT due to imperfections in its implementation. Differential TE at two nodes results in an rTE between them. In practice, the amount of TE could vary between a few tens of nanoseconds to several microseconds depending on various aspects. For example, when timing is carried via PTP over a chain of clocks, time error could accumulate along the synchronization chain due to asymmetries in the links. Amongst services requiring time-alignment, there are varying limits of rTE that can be tolerated. A further shortcoming for a GNSS signal is that it is not available indoors or in tunnels and it is also generally weak and prone to weather conditions.

PTP, which is a timestamp-exchange based protocol, has two dominant error sources unknown network asymmetry and limited timestamp resolution. Considering that PTP shares its network resources with other control and data traffic, its performance heavily depends on background network conditions. With these error sources, achieving a finer than a few hundred nanoseconds time accuracy precision without cost escalation is a challenge in most commercial PTP deployments.

With 5G and increasing over-the-air data rates, Ethernet-based fronthaul is becoming a reality. This applies challenges on good time alignment which may be difficult to achieve with the prior art time synchronization methods.

Consequently, there is a need of an improved method of providing synchronization of radio access network nodes and ARPs of radio access network nodes in a wireless communication network.

SUMMARY

It is an object of the invention to address at least some of the problems and issues outlined above. It is possible to achieve these objects and others by using methods, network nodes and wireless communication devices as defined in the attached independent claims.

According to one aspect, a method is provided performed by a system of a wireless communication network for synchronizing transmission of signals from antenna reference points, ARPs, of the wireless communication network. The method comprises initiating transmission of a first synchronization reference signal from a first ARP at a first time point in a first wireless communication resource, instructing a second ARP to determine a second time point for reception of the first synchronization reference signal, and initiating transmission of a second synchronization reference signal from the second ARP at a third time point in a second wireless communication resource, after the second ARP has received the first synchronization reference signal. The method further comprises instructing the first ARP to determine a fourth time point for reception of the second synchronization reference signal. Further, either the first and the second wireless communication resources are uplink communication resources available to wireless devices for sending uplink data, or the first and the second wireless communication resources are downlink communication resources available to the first or second ARPs for sending downlink data to the wireless devices. The method further comprises obtaining information of the second and fourth time points, and initiating transmission of data from the first ARP to the wireless devices at a time point determined based on the first, second, third and fourth time points.

According to another aspect, a method is provided performed by a first ARP of a wireless communication network for synchronizing transmission of signals from the first ARP and transmission of signals from a second ARP of the wireless communication network. The method comprises transmitting a first synchronization reference signal at a first time point in a first wireless communication resource, and receiving a second synchronization reference signal from the second ARP in a second wireless communication resource, in response to the transmission of the first synchronization reference signal. The method further comprises determining a fourth time point for the reception of the second synchronization signal. Further, either the first and the second wireless communication resources are uplink communication resources available to wireless devices for sending uplink data, or the first and the second wireless communication resources are downlink communication resources available to the first or second ARPs for sending downlink data to the wireless devices. The method further comprises transmitting signals from the first ARP to the wireless devices at a time point determined based on the first and the fourth time point, and based on information of time points for, at the second ARP, receiving the first synchronization reference signal and sending the second synchronization reference signal.

According to another aspect, a method is provided performed by a second ARP of a wireless communication network for synchronizing transmission of signals from the second ARP and transmission of signals from a first ARP of the wireless communication network. The method comprises receiving a first synchronization reference signal from the first ARP in a first wireless communication resource, determining a second time point for the reception of the first synchronization signal, and transmitting, to the first ARP, a second synchronization reference signal in a second wireless communication resource at a third time point, in response to the reception of the first synchronization reference signal. Further, either the first and the second wireless communication resources are uplink communication resources available to wireless devices for sending uplink data, or the first and the second wireless communication resources are downlink communication resources available to the first or the second ARPs for sending downlink data to the wireless devices. The method further comprises transmitting signals from the second ARP to the wireless devices at a time point determined based on the second and the third time point, and based on information of time points for, at the first ARP, sending the first synchronization reference signal and receiving the second synchronization reference signal.

According to another aspect, a system is provided operable in a wireless communication network for synchronizing transmission of signals from ARPs of the wireless communication network. The system comprises a processing circuitry and a memory. Said memory contains instructions executable by said processing circuitry, whereby the system is operative for initiating transmission of a first synchronization reference signal from a first ARP at a first time point in a first wireless communication resource, instructing a second ARP to determine a second time point for reception of the first synchronization reference signal, and initiating transmission of a second synchronization reference signal from the second ARP at a third time point in a second wireless communication resource, after the second ARP has received the first synchronization reference signal. The system is further operative for instructing the first ARP to determine a fourth time point for reception of the second synchronization reference signal, wherein either the first and the second wireless communication resources are uplink communication resources available to wireless devices for sending uplink data, or the first and the second wireless communication resources are downlink communication resources available to the first or second ARPs for sending downlink data to the wireless devices. The system is further operative for obtaining information of the second and fourth time points, and initiating transmission of data from the first ARP to the wireless devices at a time point determined based on the first, second, third and fourth time points.

According to another aspect, a first ARP is provided operable in a wireless communication network for synchronizing transmission of signals from the first ARP and transmission of signals from a second ARP of the wireless communication network. The first ARP comprises a processing circuitry and a memory. Said memory contains instructions executable by said processing circuitry, whereby the first ARP is operative for transmitting a first synchronization reference signal at a first time point in a first wireless communication resource, receiving a second synchronization reference signal from the second ARP in a second wireless communication resource, in response to the transmission of the first synchronization reference signal, and determining a fourth time point for the reception of the second synchronization signal. Further, either the first and the second wireless communication resources are uplink communication resources available to wireless devices for sending uplink data, or the first and the second wireless communication resources are downlink communication resources available to the first or second ARPs for sending downlink data to the wireless devices. Further, the first ARP is operative for transmitting signals from the first ARP to the wireless devices at a time point determined based on the first and the fourth time point, and based on information of time points for, at the second ARP, receiving the first synchronization reference signal and sending the second synchronization reference signal.

According to another aspect, a second ARP is provided operative in a wireless communication network for synchronizing transmission of signals from the second ARP and transmission of signals from a first ARP of the wireless communication network. The second ARP comprises a processing circuitry and a memory. Said memory contains instructions executable by said processing circuitry, whereby the second ARP is operative for receiving a first synchronization reference signal from the first ARP in a first wireless communication resource, determining a second time point for the reception of the first synchronization signal, and transmitting, to the first ARP, a second synchronization reference signal in a second wireless communication resource at a third time point, in response to the reception of the first synchronization reference signal. Further, either the first and the second wireless communication resources are uplink communication resources available to wireless devices for sending uplink data, or the first and the second wireless communication resources are downlink communication resources available to the first or the second ARPs for sending downlink data to the wireless devices. The second ARP is further operative for transmitting signals from the second ARP to the wireless devices at a time point determined based on the second and the third time point, and based on information of time points for, at the first ARP, sending the first synchronization reference signal and receiving the second synchronization reference signal.

According to other aspects, computer programs and carriers are also provided, the details of which will be described in the claims and the detailed description.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

There is ongoing research at the applicant of employing Over-The-Air Time synchronization between radio access network nodes (i.e. base stations) to synchronize base stations and their ARPs instead of distributing time synch through PTP or via GNSS.

For certain features, which will become more common in 5G, like Carrier Aggregation, Coordinated Multipoint or UE positioning with Observed Time Difference Of Arrival (OT-DOA), knowledge about the relative time error between the ARPs is more useful than the knowledge about the absolute time error of each ARP. For that purpose, radio interface observations can be initiated in the network. It is proposed to send synchronization reference signals back and forth between a first and a second ARP that are within radio signal distance of each other and then determine when such signals are sent and received according to the local clocks, thus achieving relative time error observations at the first and second ARPs. According to an embodiment, it is suggested to either send such synchronization reference signals at the first and the second ARP in uplink wireless communication resources, or to send such synchronization reference signals at the first and the second ARP in downlink wireless communication resources. By using existing wireless communication resources that are otherwise used for transmitting data between the wireless devices and the ARPs, a technology efficient and thereby cost-efficient solution for synchronizing ARPs by sending synchronization reference signals directly between the involved ARPs is achieved.

Figure 1:
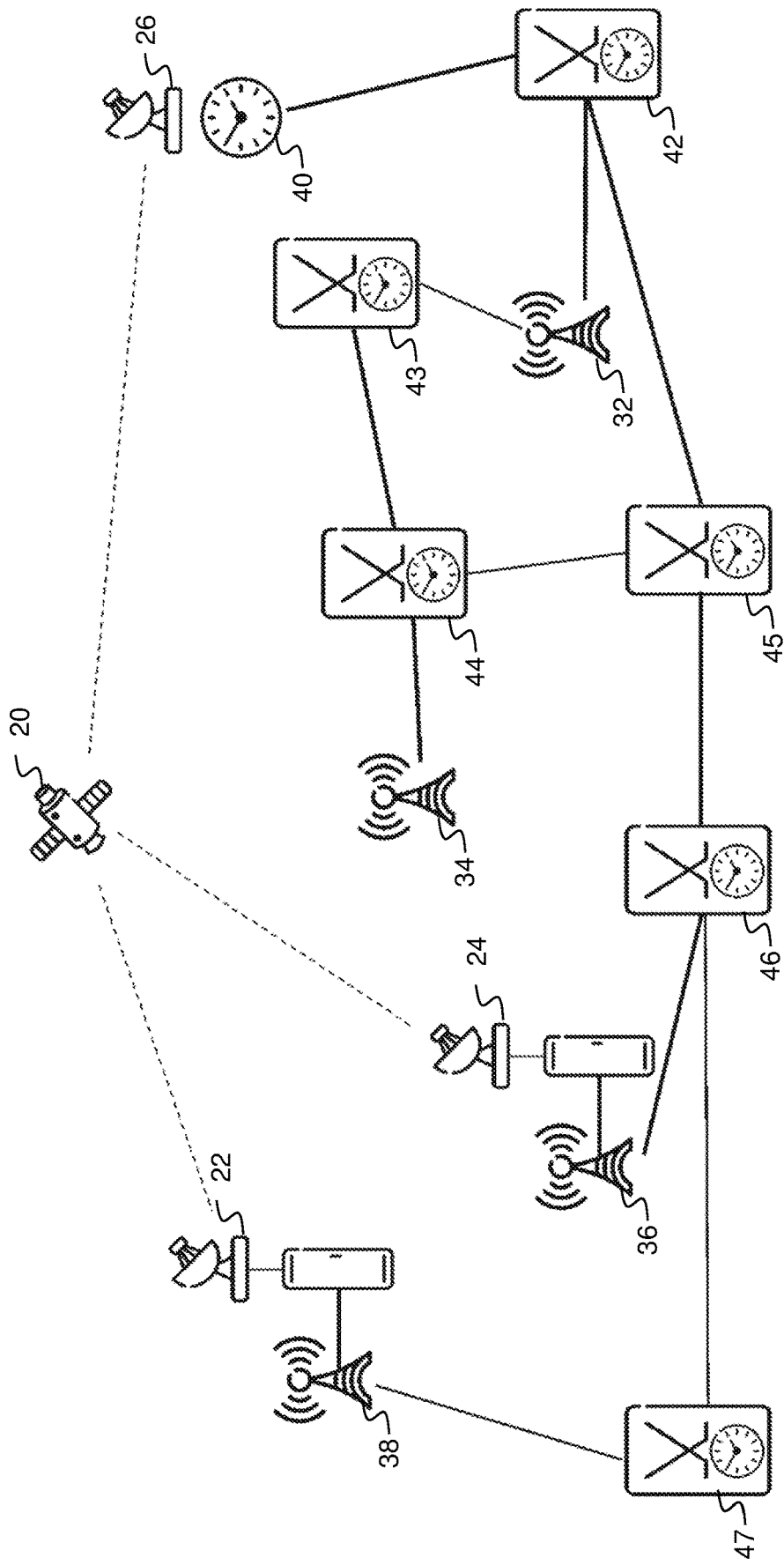
FIG. 1 is a block diagram of a wireless communication network using prior art time synchronization.
Figure 2:
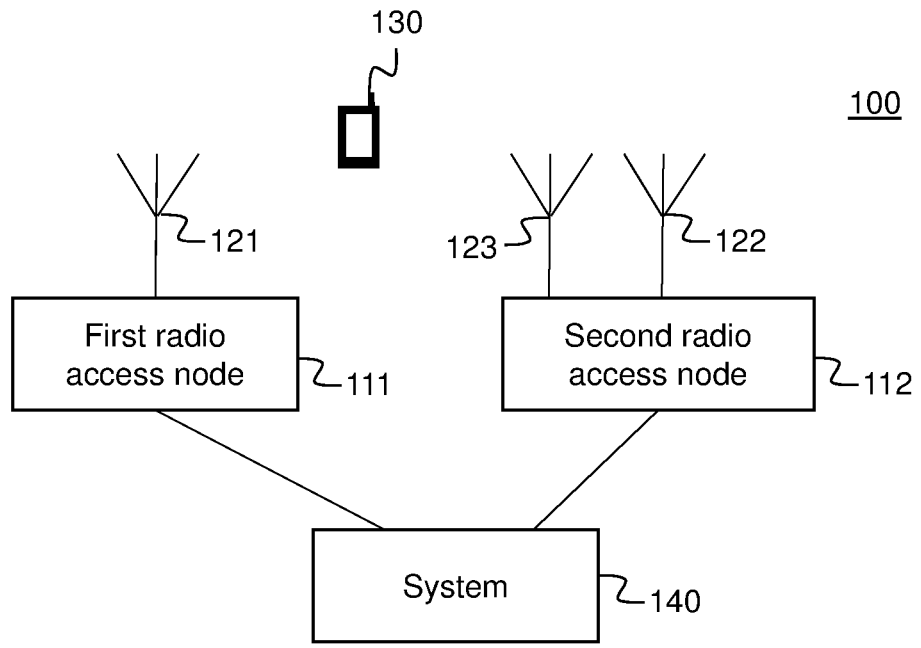
FIG. 2 is a block diagram illustrating a wireless communication network in which the present invention may be used.

FIG. 2 shows a wireless communication network 100 comprising a first radio access network node 111 having a first ARP 121. The first radio access network node 111 is adapted for wireless communication with a wireless device 130 via the first ARP 121. The wireless communication network 100 further comprises a second radio access network node 112 having a second ARP 122 and a third ARP 123. The second radio access network node 112 is adapted for wireless communication with the wireless device 130 via the second ARP 122 and/or the third ARP 123. The first and second radio access network nodes 111, 112 are connected to a system for performing embodiments of the present invention. The system may be another radio access network node or a core network node, or the system may comprise functionality for performing embodiments of the method, spread out over a plurality of physical network nodes. The ARP is the physical point in an antenna at which radiation spreads, e.g. spherically. Typical base-station antennas with simple patterns and linear polarizations have a well-defined predictable ARP. In practice, the ARP can be approximated by the physical RF connector port without impact to dependent applications.

Figure 3:
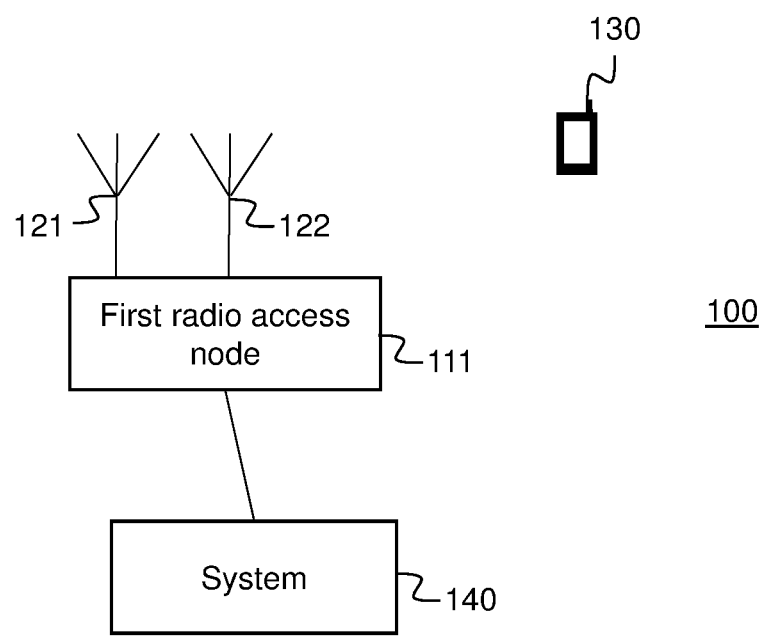
FIG. 3 is a block diagram illustrating another wireless communication network in which the present invention may be used.

FIG. 3 shows an alternative to the wireless communication network 100 of FIG. 2. In the alternative network, the first ARP 121 and the second ARP 122 are arranged to the same radio access network node, here the first radio access network node 111.

The wireless communication network 100 may be any kind of wireless communication network that can provide radio access to wireless devices. Example of such wireless communication networks are Global System for Mobile communication (GSM), Enhanced Data Rates for GSM Evolution (EDGE), Universal Mobile Telecommunications System (UMTS), Code Division Multiple Access 2000 (CDMA 2000), Long Term Evolution (LTE), LTE Advanced, Wireless Local Area Networks (WLAN), Worldwide Interoperability for Microwave Access (WiMAX), WiMAX Advanced, as well as fifth generation wireless communication networks based on technology such as New Radio (NR). The wireless communication network 100 may also be a network based on a plurality of radio access network (RAN) standards, e.g. a combination of any of the above, a so called multi-standard network.

The first and second radio access network nodes 111, 112 may each be any kind of network node that provides wireless access to the wireless device 130 alone or in combination with another network node. Examples of radio access network nodes 111, 112 are a base station (BS), a radio BS, a base transceiver station, a BS controller, a network controller, a Node B (NB), an evolved Node B (eNode B or eNB), a NR BS, a Multi-cell/multicast Coordination Entity, a relay node, an access point (AP), a radio AP, a remote radio unit (RRU), a remote radio head (RRH) and a multi-standard BS (MSR BS).

The wireless device 130 may be any type of device capable of wirelessly communicating with a radio access network node 111, 112 using radio signals. For example, the wireless device 130 may be a User Equipment (UE), a machine type UE or a UE capable of machine to machine (M2M) communication, a sensor, a tablet, a mobile terminal, a smart phone, a laptop embedded equipped (LEE), a laptop mounted equipment (LME), a USB dongle, a Customer Premises Equipment (CPE) etc. The wireless device may also be called "wireless communication device".

Figure 4:
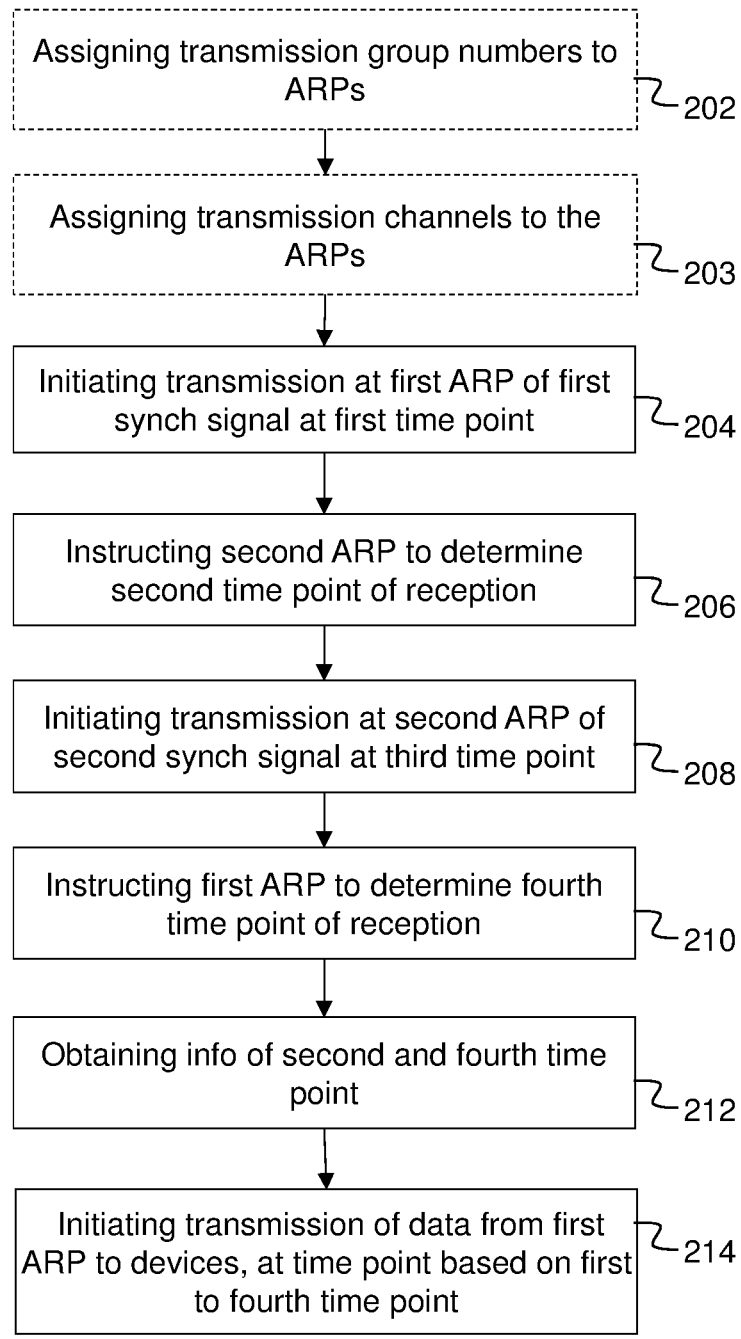
FIG. 4 is a flow chart illustrating a method performed by a system of the wireless communication network, according to possible embodiments.

FIG. 4, in conjunction with FIG. 2 or 3, shows a method performed by a system of a wireless communication network 100 for synchronizing transmission of signals from antenna reference points, ARP, 121, 122 of the wireless communication network. The method comprises initiating transmission 204 of a first synchronization reference signal from a first ARP 121 at a first time point in a first wireless communication resource, instructing 206 a second ARP to determine a second time point for reception of the first synchronization reference signal, and initiating transmission 208 of a second synchronization reference signal from the second ARP 122 at a third time point in a second wireless communication resource, after the second ARP has received the first synchronization reference signal. The method further comprises instructing 210 the first ARP to determine a fourth time point for reception of the second synchronization reference signal. Further, either the first and the second wireless communication resources are uplink communication resources available to wireless devices 130 for sending uplink data, or the first and the second wireless communication resources are downlink communication resources available to the first or second ARPs 121, 122 for sending downlink data to the wireless devices. The method further comprises obtaining 212 information of the second and fourth time points, and initiating transmission 214 of data from the first ARP 121 to the wireless devices 130 at a time point determined based on the first, second, third and fourth time points.

The first ARP 121 is connected to a first radio access network node 111. The second ARP 122 may be connected to the first radio access network node 111 or to a second radio access network node 112 different from the first radio access network node. By initiating sending of such synchronization signals between the first and second ARPs, the ARPs can be mutually synchronized so that data transmitted from the first and the second ARPs to e.g. the same wireless device are synchronized. By using existing communication resources that are otherwise used for transmitting data between the wireless devices and the ARPs, a technology efficient and thereby cost-efficient solution for synchronizing ARPs by sending synchronization reference signals directly between the involved ARPs is achieved. The first and the fourth time points may be time points according to a clock of the first ARP. The second and third time points may be time points according to a clock of the second ARP. The second ARP may be instructed to determine the second time point for reception of the first synchronization reference signal in the first wireless communication resource, i.e. reception is in the same communication resource as the signal was sent. Also, the first ARP may be instructed to determine the fourth time point for reception of the second synchronization reference signal in the second wireless communication resource. The second time point may be determined as a relative time in relation to the first time point. The fourth time point may be determined as a relative time in relation to the third time point. The uplink wireless communication resources available to wireless devices may be uplink communication resources scheduled for use by wireless devices for sending data uplink. The downlink communication resources available to the first or second radio access network nodes may be downlink communication resources scheduled for use by the first or second radio access network nodes for sending data downlink to wireless devices.

According to an embodiment, the wireless communication network 100 is a time-division duplex (TDD) based communication network, the first wireless communication resource is a downlink communication resource available to the first ARP 121 for sending downlink data to the wireless devices 130, and the second wireless communication resource is a downlink communication resource available to the second ARP 122 for sending downlink data to the wireless devices 130. Further, the first and the second wireless communication resources use a same frequency resource but different time resources.

Communication resources are divided both with respect to frequency and time, into frequency resources, aka sub-frequency bands, and time resources. By using the same frequency resource for the first and the second wireless communication resources, a reciprocal channel is achieved, which minimizes asymmetry in signal propagation time. Asymmetry in signal propagation time otherwise could be quite big for high frequency band signals in a multipath environment if they are transmitted on different frequencies.

TDD is a basic radio protocol technology. Communication using TDD is a first category of services that require a limited rTE. In a TDD network, radio access network nodes may transmit and receive signals at same frequencies. To avoid interference between signals of radio access network nodes and between signals of wireless devices communicating to different radio access network nodes operating at same frequencies in overlapping geographical areas, the radio access network nodes need to use the same TDD configurations, i.e. downlink (DL) and uplink (UL) communication at the different base stations need to be phase aligned. When transceiver (TRX) at the wireless device or radio access network node is to switch from transmitting mode to receiving mode, there is a guard period for preventing interference from the previous transmission to the subsequent. The guard period includes a margin for a rTE of neighboring radio access network nodes.

According to another embodiment, the first synchronization reference signal is initiated to be transmitted 204 from the first ARP in any of a last number of data symbols of the first downlink communication resource before a switch from the first downlink communication resource to a subsequent uplink wireless communication resource, or the second synchronization reference signal is initiated to be transmitted 208 from the second ARP in any of a last number of data symbols of the second downlink communication resource before a switch from the second downlink communication resource to a subsequent uplink wireless communication resource.

Hereby, the TRX at the second ARP just have to switch to reception mode, i.e. UL communication mode, a few symbols earlier than usual to capture the first synchronization reference signal sent by the first ARP in any of the last symbols of the DL resource. After the switch from transmission mode, i.e. DL communication mode, to reception mode, the second ARP can stay in UL communication mode during the whole UL communication resource and does not have to switch back to DL communication mode as could have been the case if the first synchronization reference signal was transmitted in the middle of a DL communication mode period. Another advantage is that the symbols preceding the switch from DL communication mode to UL communication mode are not intended to mandatory control channel transmissions and other wireless devices cannot expect to receive anything in those symbols, unless notified in advance. A wireless communication resource comprises a plurality of data symbols. "Any of the last number of data symbols" signifies any of the x number of data symbols being closest to a switch from the downlink communication resource to the subsequent uplink wireless communication resource. "X" may here be any number between 1 and 5, for example and the first signal may be sent over more than one of the x last data symbols.

According to another embodiment, the method further comprises assigning 202 each of a plurality of ARPs including the first and the second ARP, one of a plurality of transmission group numbers for transmission of synchronization reference signals in such a way that two ARPs of the plurality of ARPs that are within mutual radio coverage are assigned different transmission group numbers. Further, ARPs of the plurality of ARPs that have the same transmission group number are assigned the same time transmission group resource for transmitting synchronization reference signals, but ARPs of the plurality of ARPs having different group numbers are assigned different time transmission group resources for transmitting synchronization reference signals. Further, the initiating of transmission 204 of the first synchronization reference signal and the initiating of transmission 208 of the second synchronization reference signal is performed according to the assigning so that the first and the second synchronization reference signal are transmitted in different time transmission group resources.

The time transmission group resources may be time frame numbers and the ARPs in the same group then transmits in the same time frame but ARPs in different groups transmit in different time frames. As the first and the second ARPs are within mutual radio coverage they are assigned different time transmission group resources. Further, two ARPs of the plurality of ARPs that are not within mutual radio coverage may be assigned the same or different transmission group number. By allocating transmission groups to ARPs so that it is possible that ARPs that are not to hear each other's synchronization reference signals are grouped together in the same transmission group, an efficient allocation of synchronization reference signals is achieved that does not use so many time resources in total.

According to an embodiment, the method further comprises assigning 203 each of the plurality of ARPs one of a plurality of transmission channels for the transmission of synchronization reference signals, such that ARPs of the plurality of ARPs that are assigned the same transmission group but are to transmit synchronization reference signals to the same ARP are assigned different transmission channels. Further, the initiating of transmission 204 of the first synchronization reference signal and the initiating of transmission of a third synchronization reference signal from a third ARP that is assigned the same transmission group as the first ARP is performed according to the assigning so that the first and the third synchronization reference signal are transmitted in different transmission channels.

A transmission channel may be a transmission sub-frequency band. The third synchronization reference signal is to be received by the second ARP as do the first synchronization reference signal. As the first and the third ARP are in the same transmission group they will transmit at the same time transmission resource. If the first and the third ARP are to transmit synchronization reference signals to the second ARP (which lies in between them) in the same channel, the synch signals from the first and the third ARPs will interfere with each other at the second ARP. In order to lower the interference at the second ARP, the first and the third ARP are allocated to transmit at different channels (i.e. frequencies).

Figure 5:
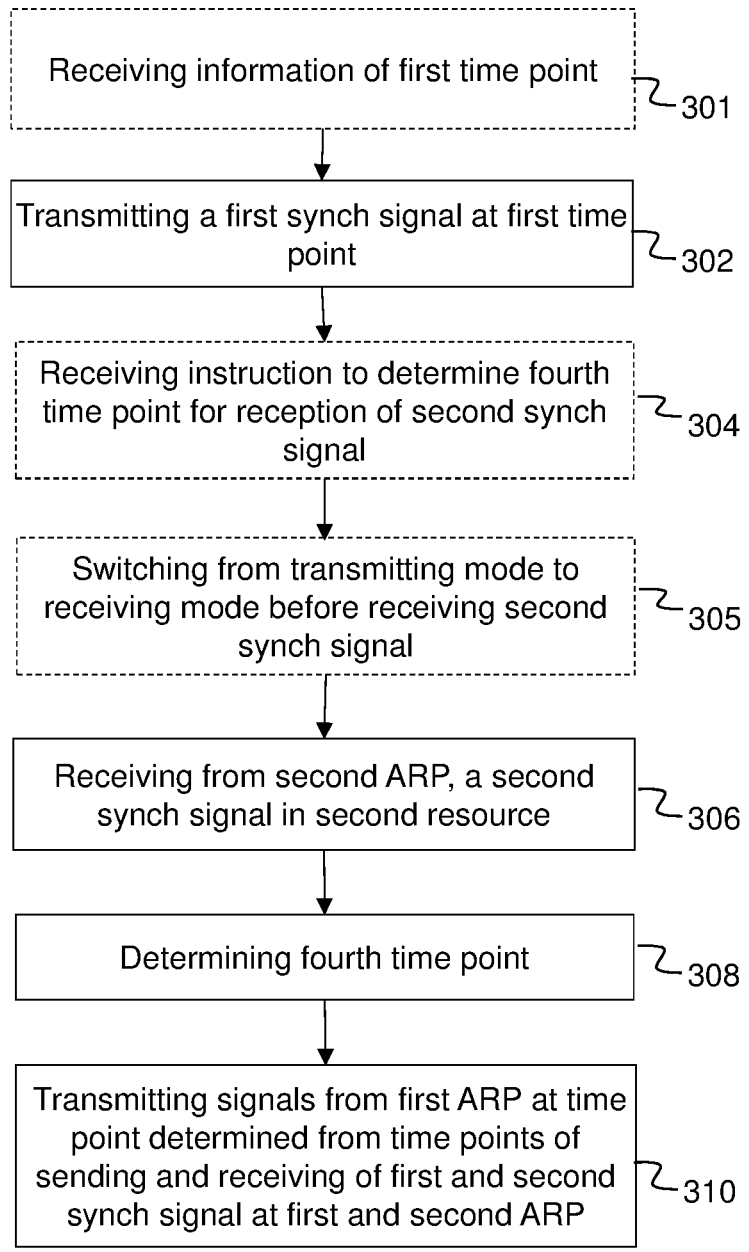
FIG. 5 is a flow chart illustrating a method performed by a first ARP of the wireless communication network, according to possible embodiments.

FIG. 5, in conjunction with FIG. 2 or 3, describes a method performed by a first ARP 121 of a wireless communication network 100 for synchronizing transmission of signals from the first ARP 121 and transmission of signals from a second ARP 122 of the wireless communication network. The method comprises transmitting 302 a first synchronization reference signal at a first time point in a first wireless communication resource, and receiving 306 a second synchronization reference signal from the second ARP 122 in a second wireless communication resource, in response to the transmission of the first synchronization reference signal. The method further comprises determining 308 a fourth time point for the reception of the second synchronization signal. Further, either the first and the second wireless communication resources are uplink communication resources available to wireless devices 130 for sending uplink data, or the first and the second wireless communication resources are downlink communication resources available to the first or second ARPs for sending downlink data to the wireless devices. The method further comprises transmitting 310 signals from the first ARP 121 to the wireless devices 130 at a time point determined based on the first and the fourth time point, and based on information of time points for, at the second ARP 122, receiving the first synchronization reference signal and sending the second synchronization reference signal.

By sending such first and second synchronization signals between the first and second ARP, the first and second ARP can be mutually synchronized so that data transmitted from the ARPs to e.g. the same wireless device are synchronized. By using existing wireless communication resources that are otherwise used for transmitting data between the wireless devices and the ARPs, a technology-efficient and thereby cost-efficient solution for synchronizing ARPs is achieved. The first and the fourth time points may be time points according to a clock of the first ARP. The time points for, at the second ARP 122, receiving the first synchronization reference signal and sending the second synchronization reference signal may be time points according to a clock of the second ARP.

According to an embodiment, the wireless communication network 100 is a TDD-based communication network, the first and the second wireless communication resources are downlink communication resources available to the first and the second ARP 121, 122 for sending downlink data to the wireless devices 130, and the first and the second wireless communication resources use a same frequency resource but different time resources.

According to another embodiment, the first synchronization reference signal is transmitted 302 in any of a last number of data symbols of the first downlink communication resource before a switch from the first downlink communication resource to a subsequent uplink wireless communication resource. In other words, the first time point lies in any of the last number of data symbols of the first DL communication resource.

According to another embodiment, the second synchronization reference signal is received 306 from the second ARP 122 in any of a last number of data symbols of the second wireless communication resource. Further, the method comprises switching 305 from transmitting mode to receiving mode just before the second synchronization referenced signal is received.

By the first ARP switching from transmitting mode to receiving mode just before the second synch signal is received from the second ARP, the first ARP can receive it in TDD, by its receiver part. The "just before" may here be one or more symbols before the symbol when the second synch signal is sent by the second ARP. The first ARP may receive an instruction from the system, or the first ARP may be configured when to switch from downlink to uplink communication mode. The switching from transmitting mode to receiving mode comprises disconnecting a transmitter part of the ARP to an antenna of the ARP and connecting a receiver part of the ARP to the antenna.

According to another embodiment, the method further comprises receiving 301 information of the first time point from a system of the communication network.

According to another embodiment, the second wireless communication resource is known at the first ARP 121. Listening for signals at numerous possible transmission occasions wastes resources that could have been used for the first ARP's DL transmission. By the first ARP knowing in advance when, i.e. at which time communication resource the second synchronization reference signal will be transmitted and at which frequency sub-band, i.e. transmission pattern, communication resources will be saved as the first ARP as receiving node knows when to listen. The same is to say for the second ARP as receiving node for the first synchronization reference signal. The transmission pattern may be hardcoded at the first and the second ARP. Alternatively, the first ARP is informed by a system of the network of the transmission pattern. A time communication resource may be for example one or more time slots or symbols.

According to an embodiment, the first synchronization reference signal is transmitted 302 as a bit sequence derived from a Zadoff-Chu sequence or from a Gold Sequence. Many signals can be sent using same frequency and same time, i.e. same communication resource, and can still be detected. Important property of a Zadoff-Chu (ZC) sequence is its Peak to Average Power Ratio (PAPR) properties, that is, when applied to radio signal gives rise to electromagnetic signal of constant amplitude in time and frequency. That property helps to make good channel estimate and provide good hearing ability. Further, it has good cross-correlation properties, which enable easy detection. Many reference signals use ZC sequence also for uplink signals, so additional benefit is that there are receiver parts that can be re-used. Gold sequence also has good cross-correlation properties.

According to another embodiment, the method further comprises receiving 304 an instruction from a system of the communication network to determine 308 the fourth time point.

Figure 6:
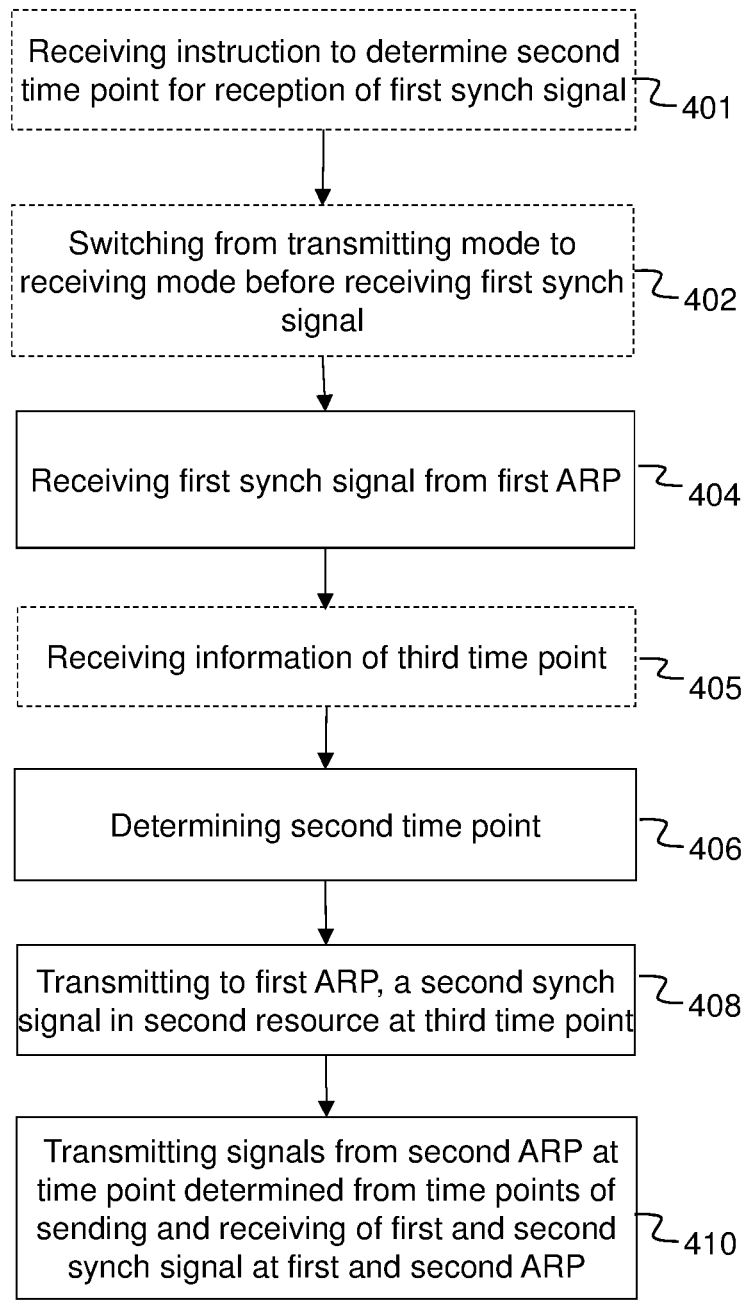
FIG. 6 is a flow chart illustrating a method performed by a second ARP of the wireless communication network, according to possible embodiments.

FIG. 6, in conjunction with FIG. 2 or 3, describes a method performed by a second ARP 122 of a wireless communication network 100 for synchronizing transmission of signals from the second ARP 122 and transmission of signals from a first ARP 121 of the wireless communication network. The method comprises receiving 404 a first synchronization reference signal from the first ARP in a first wireless communication resource, determining 406 a second time point for the reception of the first synchronization signal, and transmitting 408, to the first ARP, a second synchronization reference signal in a second wireless communication resource at a third time point, in response to the reception 404 of the first synchronization reference signal. Further, either the first and the second wireless communication resources are uplink communication resources available to wireless devices for sending uplink data, or the first and the second wireless communication resources are downlink communication resources available to the first or the second ARPs for sending downlink data to the wireless devices. The method further comprises transmitting 410 signals from the second ARP to the wireless devices at a time point determined based on the second and the third time point, and based on information of time points for, at the first ARP, sending the first synchronization reference signal and receiving the second synchronization reference signal.

According to an embodiment, the wireless communication network 100 is a TDD-based communication network, the first and the second wireless communication resources are downlink communication resources available to the first and the second ARP 121, 122 for sending downlink data to the wireless devices 130, and the first and the second wireless communication resources use a same frequency resource but different time resources.

According to another embodiment, the second synchronization reference signal is transmitted 406 in any of a last number of data symbols of the second downlink communication resource before a switch from the second downlink communication resource to a subsequent uplink communication resource.

According to another embodiment, the first synchronization reference signal is received 404 from the first ARP 121 in any of a last number of data symbols of the first wireless communication resource. The method further comprises switching 402 from transmitting mode to receiving mode just before the first synchronization referenced signal is received.

According to another embodiment, the method further comprises receiving 405 information of the third time point from a system of the communication network.

According to another embodiment, the first wireless communication resource is known at the second ARP 121.

According to another embodiment, the second synchronization reference signal is transmitted 408 as a bit sequence derived from a Zadoff-Chu sequence or from a Gold Sequence.

According to another embodiment, the method further comprises receiving 401 an instruction from a system of the communication network to determine 406 the second time point.

According to an embodiment, a resource efficient synchronization reference signal design is provided. The synchronization reference signal design has a deterministic scheduling pattern suitable for radio access network node to radio access network node observations over the air.

According to an embodiment, a synchronization reference signal that is transmitted from one radio access network node on downlink communication resources is to be received at another radio access network node on downlink resources. Alternatively, a synchronization reference signal transmitted from one radio access network node on uplink communication resources is to be received at another radio access network node on uplink resources. Such a solution can be used for cell-internal observations, i.e. for ARPs providing radio connection to the same cell.

According to another embodiment, transmission of a synchronization reference signal from one radio access network node in TDD-based networks is done in the last symbols before the guard symbols preceding a switch from downlink communication mode to uplink communication mode, i.e. from transmitting mode to receiving mode, at the one radio access network node. Transmission adjacent to the guard period in TDD-based networks requires minimal impact on uplink-downlink pattern and allows to ensure low-interference symbols and thus improved accuracy. Transmission adjacent to the guard period in TDD systems favors the receiving radio access network node that would avoid additional antenna switch between downlink and uplink resources.

According to another embodiment, a bit sequence of the synchronization reference signal sequence is a Zadoff-Chu (ZC) sequence, where ZC root sequence number serves as transmission source identifier, or a length-31 Gold sequence, where initialization value serves as transmission source identifier. Such sequences achieves time, frequency and code-domain orthogonality for the reference signal.

According to another embodiment, a transmission group number assigned to each antenna reference point determines its transmission occasion, i.e. transmission time period. According to a variant, a channel number may also be assigned to each antenna reference point, the channel number determining its transmission sub-band, i.e. transmission frequency range. Hereby, simultaneous observations of several antenna reference points from one and the same antenna reference points is enabled. Also, comparative rTE measurements from several antenna reference points are enabled. Further, such assigning of transmission group and possibly also channel numbers achieves a more flexible scheduling than standard reference signals as different antenna reference point transmissions can be made orthogonal to each other unlike standard reference signals that are configured at cell-level.

According to another embodiment, an information exchange procedure is proposed between the radio access network nodes carried over backhaul connections, for example via cable connections between the radio access network nodes. The information exchange procedure may be accomplished over back haul protocols such as X2, which is an LTE eNodeB to eNodeB backhaul protocol, Xn, which is an NR gNodeB to gNodeB backhaul protocol and F1, which is a high layer split protocol in NR. Such information may concern reference signal settings and measurement result. Enables adaptive scheduling, such as fewer or more symbols/bandwidth depending on channel conditions such as clear line of sight or multi path etc.

Figure 7:
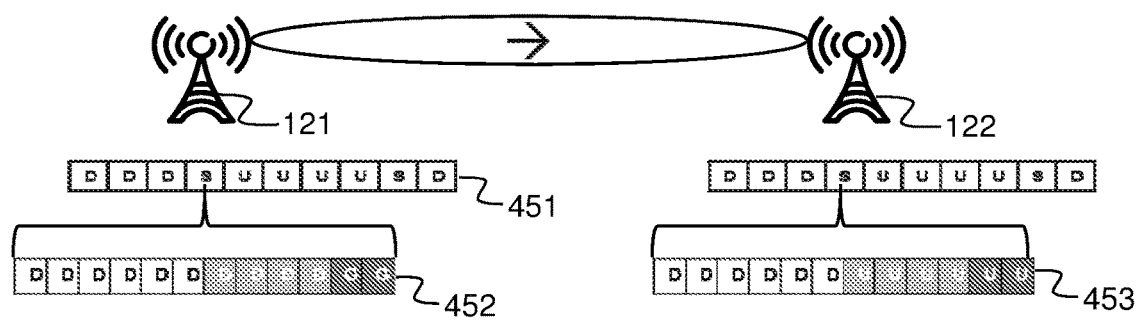
FIG. 7 is a communication scenario between two ARPs for communicating synchronization reference signals, according to an embodiment.
Figure 8:
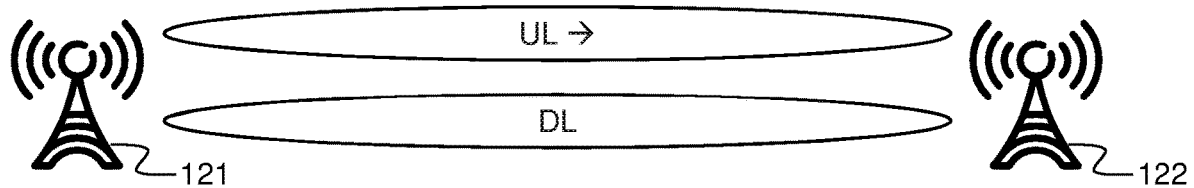
FIG. 8 is another communication scenario between two ARPs for communicating synchronization reference signals, according to another embodiment.

In the following, an embodiment is described for implementation in LTE and/or NR radio access networks (RAN). FIGS. 7 and 8 show examples of radio resource utilization for transmission of a synchronization reference signal from a first radio access network node/antenna reference point 121 for reception of the synchronization at a second radio access network node/antenna reference point 122. FIG. 7 shows an example of a TDD-based network and FIG. 8 shows an example of a Frequency Division Duplex (FDD) based system.

For the TDD-based example, the first node 121 transmits a synchronization reference signal by its transmitter part, i.e. the first node 121 is in transmitting mode aka downlink mode when transmitting the synchronization reference signal. At the same time, the second node 122 switches from its transmitter part to its receiver part instead, i.e. switches from downlink mode to uplink mode aka receiving mode to be able to receive the expected synchronization reference signal. This is an example in which the synchronization signal is sent and received at scheduled downlink wireless transmission resources.

FIG. 7 shows an example in which a radio frame 451 comprises consecutive time slots, here exemplified by four downlink (D) time slots, one special slot (S) 452 and four uplink slots (U) in consecutive order. According to an embodiment, the synchronization reference signal is transmitted from the first node 121 in the special slot 452 and received by the second node 122 in the special slot. The special slot 452, aka the slot including a switch from downlink to uplink resources, comprises a number of symbols, here exemplified by twelve symbols of which ten are used for downlink communication and the two last are guard symbols. The synchronization reference signal is sent in one or more of the four last downlink symbols, for example all symbols 7-10. For this reason, the first node is in downlink mode all ten symbols and switches to uplink mode at the guard symbols. At the receiving side, on the other hand, the second node 122 switches from downlink mode to uplink mode already at the seventh symbol so that the second node can receive the synchronization reference signal sent in one or more of the symbols 7-10. This is symbolized by the "U"s in symbols 7-12 of the received special slot 453.

Transmission of synchronization reference signal from the first and the second node is done on the same frequency but at different time. Transmission on the same frequency in both directions ensures equal signal propagation time in both directions due to channel reciprocity. In TDD systems it is beneficial to transmit synchronization reference signal in downlink resources adjacent to the guard symbols before uplink switch. The second node would then avoid additional antenna switch that otherwise would be needed.

FIG. 8 illustrates transmission and reception of synchronization reference signals in an FDD-based system. In FDD systems the synchronization reference signals can be transmitted in any resources that are not reserved for mandatory transmission by the standard, for example in the same way as described above in relation to FIG. 7, or in an uplink resource.

According to another embodiment, not shown, in which the synchronization signal is sent and received at scheduled uplink wireless transmission resources, the first node 121 avoids scheduling of uplink UE data at certain occasion and instead transmits synchronization reference signal on its uplink resources. The second node 122 then receives the synchronization reference signal on its uplink resources.

The first and second node 121, 122 take turns in transmitting and receiving the synchronization reference signal. Transmission is done according to the transmitting node's/ARP's clock and reception is done according to the receiving node's/ARP's clock. Transmission occasion is known by both nodes in advance, either hardcoded or exchanged over a backhaul protocol.

If both nodes/ARPs are synchronized to an external time reference, this method may be used to observe the accuracy of their mutual time alignment. This method may also be used to synchronize the second node to the first node. In that case reception of synchronization reference signal at the second node sets its clock.

Synchronization reference signal sequence may be based on a Zadoff-Chu sequence or Gold sequence, both having good correlation properties and both being widely used for other purposes within the telecommunications world. A number of a root sequence of the Zadoff-Chu sequence or an initialization value of the Gold sequence serves as source identity. Sequence length and time domain scheduling can be made configurable.

According to another embodiment, a transmission group number is introduced. A transmission group number is then assigned to each ARP involved in Over the Air Observations for synchronization purposes. The transmission group number determines in which node frame number the synchronization reference signal is to be sent. For example, ARPs of one and the same Transmission Group transmit their reference signal in downlink symbols adjacent to the Guard symbols in a node frame number that is equal to its group number. That means that ARPs belonging to the same transmission group will transmit their signal at the same time and thus will not be able to hear each other.

Further, to separate received signals sent by different ARPs in the same transmission group, transmission channels are introduced. Transmission from the same ARP can be done over one or several channels. A channel is defined as a frequency sub-band on which the synchronization reference signal is to be transmitted. Synchronization reference signals can be received on the same channel from sources in different groups (at different occasions) or from sources in the same group on different channels (at the same occasion). Channel number decides the signal mapping to the resource elements in the frequency domain. How many different channels one antenna can serve at one occasion is dependent on its bandwidth and used numerology.

Figure 9:
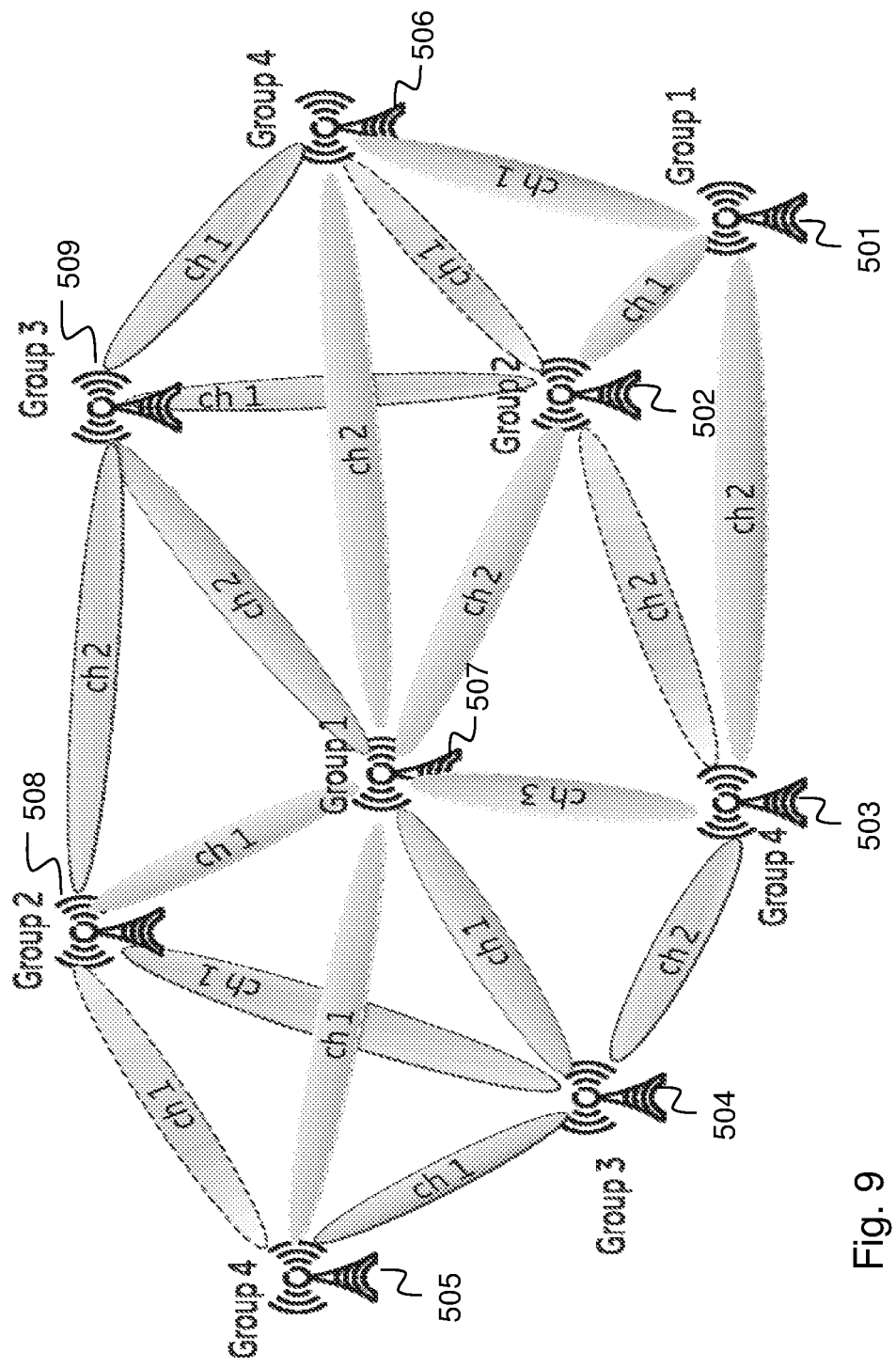
FIG. 9 is a schematic diagram of a wireless communication network illustrating usage of transmission group numbers and transmission channels according to an embodiment.

FIG. 9 shows an example of transmission group (Group X) allocation and transmission channel (ch X) allocation in a network in which nine ARPs 501-509 are to be involved in over-the-air observation for the purpose of time synchronization between the nine ARPs. Transmission groups are allocated (or assigned) in such a way that two ARPs of the plurality of ARPs that are within mutual radio coverage are assigned different transmission group numbers, see e.g. ARP 501 and ARP 502. Further, two ARPs of the plurality of ARPs that are not within mutual radio coverage may be assigned either the same transmission group numbers, see e.g. ARP 501 and ARP 507, or different transmission group numbers, see e.g. ARP 501 and ARP 508. Further, ARPs of the plurality of ARPs that have the same transmission group number are assigned the same time transmission group resource, e.g. same frame number, for transmitting synchronization reference signals, but ARPs of the plurality of ARPs having different group numbers are assigned different time transmission group resources, e.g. different frame numbers, for transmitting synchronization reference signals. Further, transmission channels are allocated (or assigned) in such a way that two ARPs of the plurality of ARPs that are assigned the same transmission group but are to transmit synchronization reference signals to the same ARP are assigned different transmission channels. As an example, see ARP 501 and ARP 507, wherein ARP 507 is assigned channel 2 (ch 2) for its transmission and ARP 501 is assigned channel 1 for its transmission.

Figure 10:
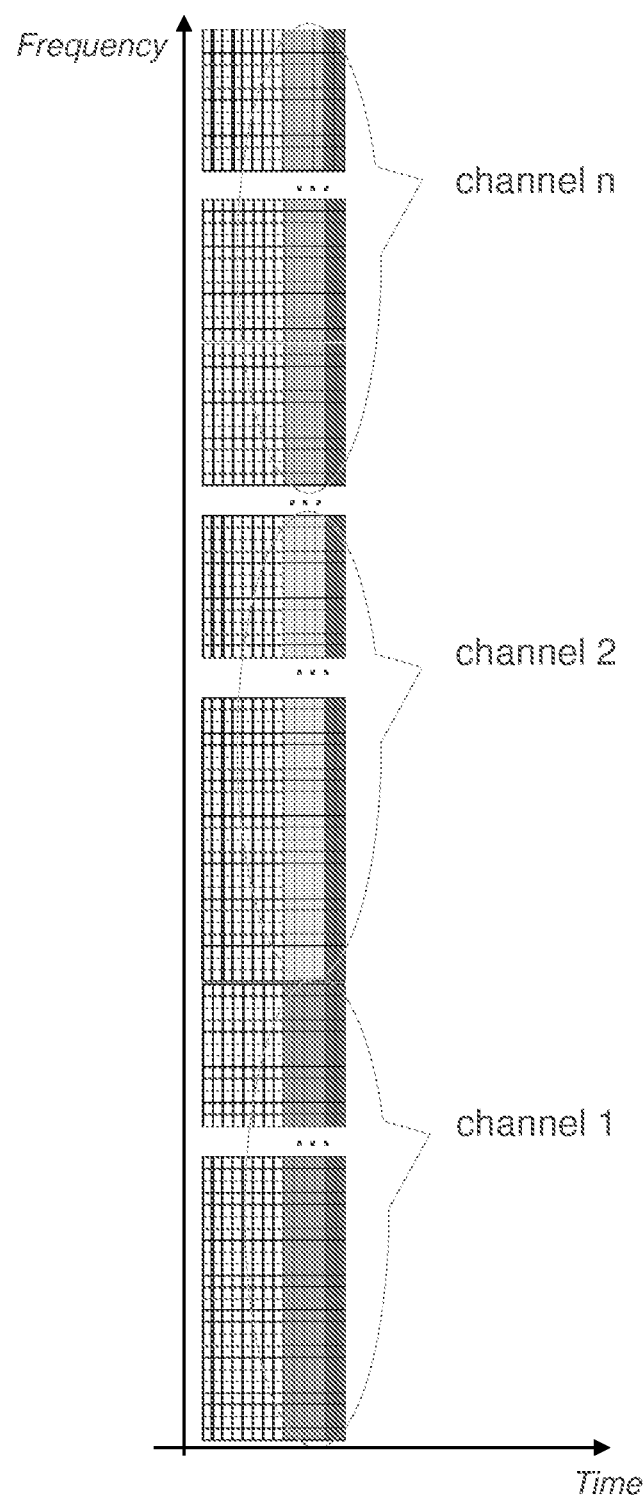
FIG. 10 is a Cartesian diagram illustrating an example of reference signal design for over the air observations, according to an embodiment.

FIG. 10 shows an example of frequency ranges allocated for such different channels 1-n. One time slot is shown for each channel, and the time slot comprises a number of symbols in which the symbols that are marked grey are used for sending synchronization reference signals and symbols marked black are guard symbols.

Figure 11:
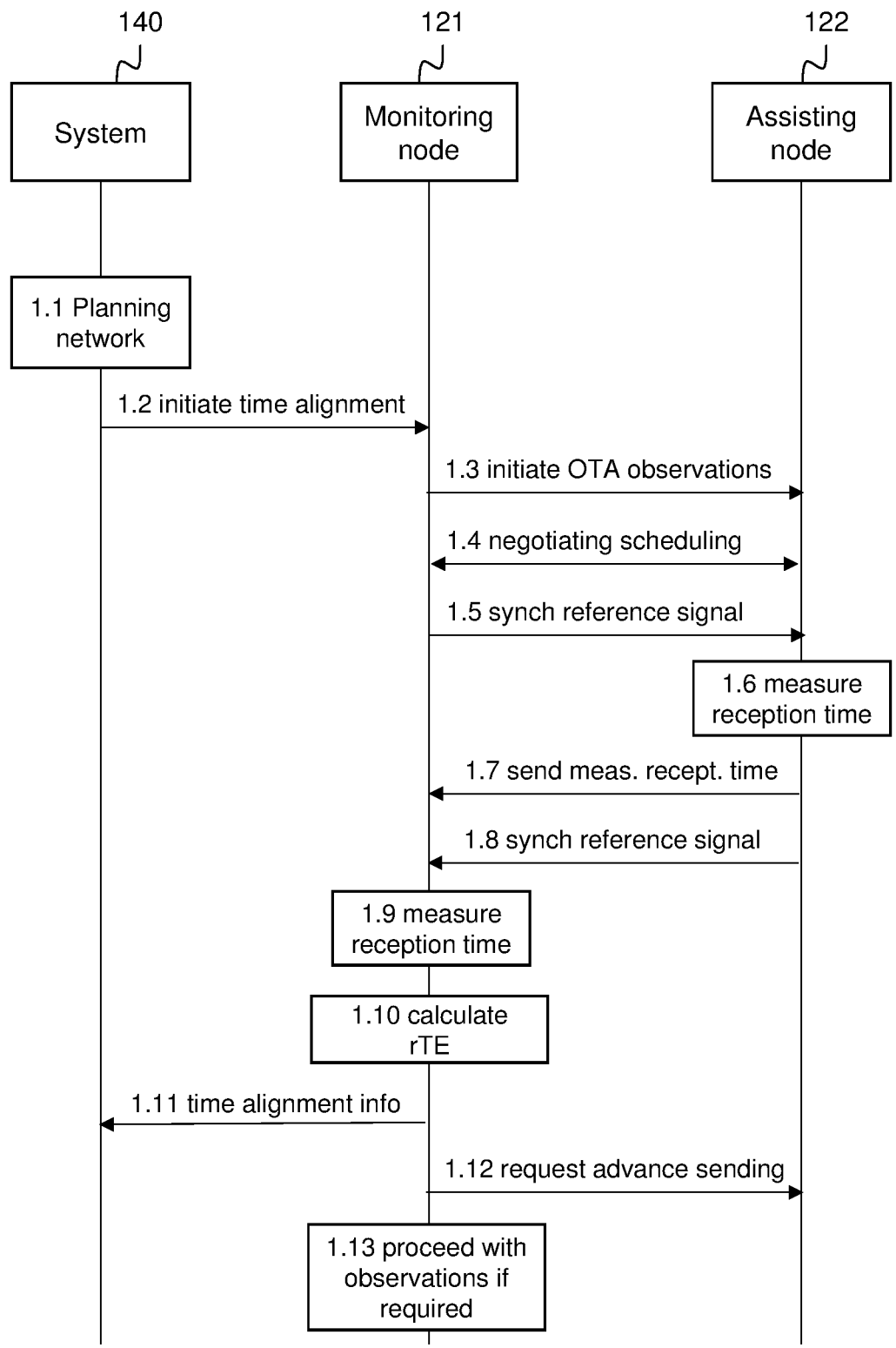
FIG. 11 is a signaling diagram illustrating an example of a procedure according to further possible embodiments.

FIG. 11 describes an embodiment of a method for synchronizing two ARPs of two different radio access network nodes, called monitoring node 121 and assisting node 122. At step 1.1, a system of the network plans the network for over the air observations. This is performed by assigning ARPs that are intended to participate in mutual over the air observations a transmission group number as e.g. described above. This may be done as part of the network planning process and antenna positions and directions are known. Antennas that are supposed to hear each other should be assigned different transmission group numbers, as described above. At step 1.2 the system initiates time alignment monitoring at the monitoring node 121 by providing the monitoring node with information of its neighbor nodes it is supposed to observe, what antennas shall participate in the observations and what their Transmission Group number and Channel number is, including its own transmission group number and channel number. Further, the monitoring node 121 initiates 1.3 Over the Air observations by notifying its neighbor nodes, including the assisting node 122 that Over The Air observations are needed and provides necessary information such as transmission group and channel number for the assisting node 122. This may be performed over a backhaul interface/protocol. The Monitoring node 121 and the assisting node 122 have possibility to negotiate 1.4 observation scheduling and channel. This may be performed over a backhaul interface/protocol. At 1.5-1.9 monitoring node 121 and assisting node 122 transmit the synchronization reference signal at scheduled occasions, while the peer nodes measures time of arrival of the reference signal. Assisting nodes 122 send their measurements to the Monitoring node 121. More specifically, at 1.5 the monitoring node 121 sends the synchronization reference signal over the air at a scheduled first time point. The assisting node 122 receives 1.6 the reference signal and determines its reception time point (second time point). When determining the second time point, the assisting node may determine or measure the reception time point in relation to the first (transmission) time point, i.e. i determines that the reference signal was received x time units after/before the transmission time point, according to the clock of the assisting node, x may also be called lag_A, i.e. delay experienced by the Assisting node. The assisting node 122 then sends 1.7 the determined reception time point or the determined lag_A. The sending at 1.7 may be performed over backhaul protocols. Further, the assisting node sends 1.8 its synchronization reference signal at a scheduled third time point and the monitoring node receive 1.9 the reference signal and measures its reception time point (fourth time point) or lag_M, i.e. delay experienced by the Monitoring node. Thereafter, the monitoring node 121 calculates relative time error (rTE) between the assisting node 122 and the monitoring node 121 based on the first, second, third and fourth time point. Time alignment information, i.e. rTE, 1.11 may then be sent to the system. Thereafter, the monitoring node 121 may request 1.12 the assisting node 122 to send the reference signal in advance with the calculated signal propagation time, thus achieving comparative observations of rTE. The request 1.12 may be sent over backhaul protocols. The rTE measurements may continue 1.13 for as long as necessary.

Figure 12:
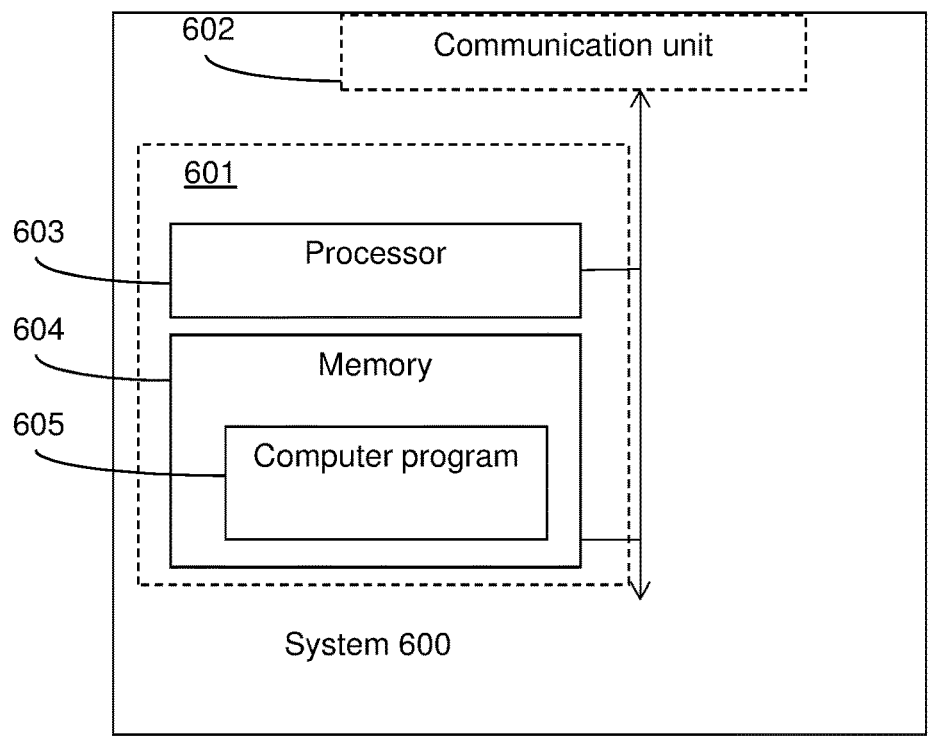
FIG. 12 is a block diagram illustrating a system of the wireless communication network in more detail, according to further possible embodiments.

FIG. 12, in conjunction with FIG. 2 or FIG. 3, describes an embodiment of a system 600 operable in wireless communication network for synchronizing transmission of signals from ARPs 121, 122 of the wireless communication network. The system 600 comprises a processing circuitry 603 and a memory 604. Said memory contains instructions executable by said processing circuitry, whereby the system 600 is operative for initiating transmission of a first synchronization reference signal from a first ARP 121 at a first time point in a first wireless communication resource, instructing a second ARP 122 to determine a second time point for reception of the first synchronization reference signal, and initiating transmission of a second synchronization reference signal from the second ARP 122 at a third time point in a second wireless communication resource, after the second ARP has received the first synchronization reference signal. The system is further operative for instructing the first ARP to determine a fourth time point for reception of the second synchronization reference signal, wherein either the first and the second wireless communication resources are uplink communication resources available to wireless devices 130 for sending uplink data, or the first and the second wireless communication resources are downlink communication resources available to the first or second ARPs for sending downlink data to the wireless devices. The system is further operative for obtaining information of the second and fourth time points, and initiating transmission of data from the first ARP 121 to the wireless devices 130 at a time point determined based on the first, second, third and fourth time points.

The system 600 of the wireless communication network may be implemented in a wireless communication network node, such as a core network node 140 (FIGS. 2 and 3). Alternatively, the system may be implemented in any of the first or second radio access network node 111, 112 or in any other radio access network node. Alternatively, the system of the wireless communication network may be implemented in a group of network nodes, wherein functionality is spread out over different physical, or virtual, nodes of the network. In other words, the system may be a cloud-solution, i.e. the system may be deployed as cloud computing resources that may be distributed in the network.

According to an embodiment, the system is further operative for assigning each of a plurality of ARPs including the first and the second ARP, one of a plurality of transmission group numbers for transmission of synchronization reference signals in such a way that two ARPs of the plurality of ARPs that are within mutual radio coverage are assigned different transmission group numbers, wherein ARPs of the plurality of ARPs that have the same transmission group number are assigned the same time transmission group resource for transmitting synchronization reference signals, but ARPs of the plurality of ARPs having different group numbers are assigned different time transmission group resources for transmitting synchronization reference signals. Further, the system is operative for the initiation of transmission of the first synchronization reference signal and the initiation of transmission of the second synchronization reference signal according to the assigning so that the first and the second synchronization reference signal are transmitted in different time transmission group resources.

According to another embodiment, the system is further operative for assigning each of the plurality of ARPs one of a plurality of transmission channels for the transmission of synchronization reference signals, such that ARPs of the plurality of ARPs that are assigned the same transmission group but are to transmit synchronization reference signals to the same ARP are assigned different transmission channels, wherein the initiating of transmission of the first synchronization reference signal and the initiating of transmission of a third synchronization reference signal from a third ARP that is assigned the same transmission group as the first ARP is performed according to the assigning so that the first and the third synchronization reference signal are transmitted in different transmission channels.

According to other embodiments, the system 600 may further comprise a communication unit 602, which may be considered to comprise conventional means for communication with nodes of the wireless communication network 100. The instructions executable by said processing circuitry 603 may be arranged as a computer program 605 stored e.g. in said memory 604. The processing circuitry 603 and the memory 604 may be arranged in a sub-arrangement 601. The sub-arrangement 601 may be a micro-processor and adequate software and storage therefore, a Programmable Logic Device, PLD, or other electronic component(s)/processing circuit(s) configured to perform the methods mentioned above. The processing circuitry 603 may comprise one or more programmable processor, application-specific integrated circuits, field programmable gate arrays or combinations of these adapted to execute instructions.

The computer program 605 may be arranged such that when its instructions are run in the processing circuitry, they cause the system 600 to perform the steps described in any of the described embodiments of the system 600 and its method. The computer program 605 may be carried by a computer program product connectable to the processing circuitry 603. The computer program product may be the memory 604, or at least arranged in the memory. The memory 604 may be realized as for example a RAM (Random-access memory), ROM (Read-Only Memory) or an EEPROM (Electrical Erasable Programmable ROM). Further, the computer program 605 may be carried by a separate computer-readable medium, such as a CD, DVD or flash memory, from which the program could be downloaded into the memory 604. Alternatively, the computer program may be stored on a server or any other entity to which the system 600 has access via the communication unit 602. The computer program 605 may then be downloaded from the server into the memory 604.

Figure 13:
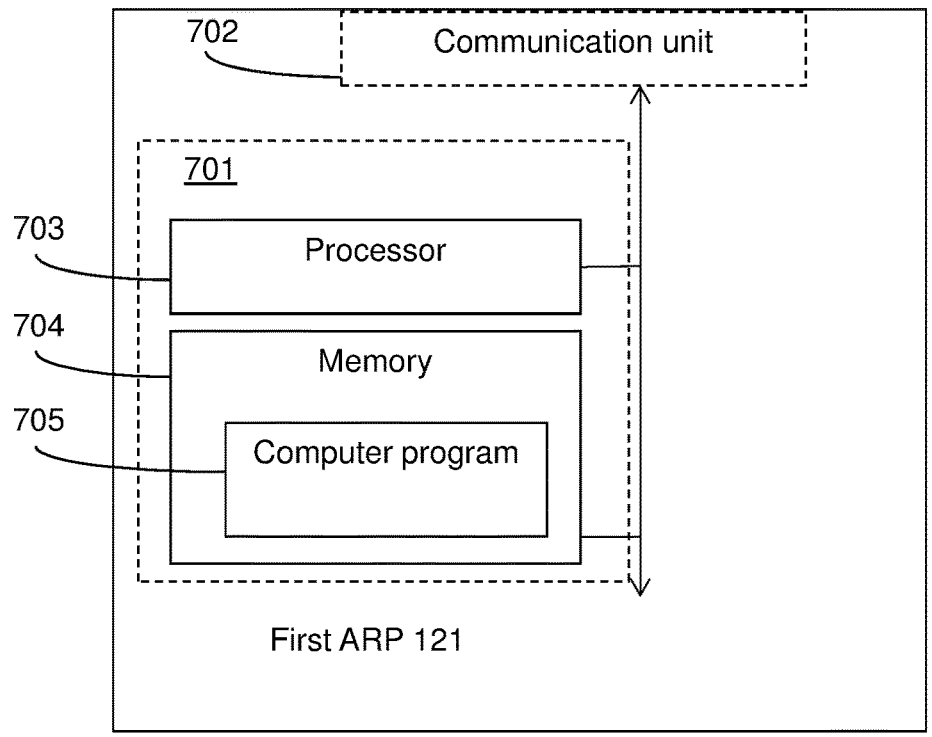
FIG. 13 is a block diagram illustrating a first ARP in more detail, according to further possible embodiments.

FIG. 13, in conjunction with FIG. 2 or FIG. 3, describes an embodiment of a first ARP 121 operable in a wireless communication network for synchronizing transmission of signals from the first ARP and transmission of signals from a second ARP 122 of the wireless communication network. The first ARP 121 comprises a processing circuitry 703 and a memory 704. Said memory contains instructions executable by said processing circuitry, whereby the first ARP 121 is operative for transmitting a first synchronization reference signal at a first time point in a first wireless communication resource, receiving a second synchronization reference signal from the second ARP 122 in a second wireless communication resource, in response to the transmission of the first synchronization reference signal, and determining a fourth time point for the reception of the second synchronization signal. Further, either the first and the second wireless communication resources are uplink communication resources available to wireless devices 130 for sending uplink data, or the first and the second wireless communication resources are downlink communication resources available to the first or second ARPs for sending downlink data to the wireless devices. Further, the first ARP 121 is operative for transmitting signals from the first ARP 121 to the wireless devices 130 at a time point determined based on the first and the fourth time point, and based on information of time points for, at the second ARP 122, receiving the first synchronization reference signal and sending the second synchronization reference signal.

According to an embodiment, the wireless communication network 100 is a TDD-based communication network, the first and the second wireless communication resources are downlink communication resources available to the first and the second ARP 121, 122 for sending downlink data to the wireless devices 130, and the first and the second wireless communication resources use a same frequency resource but different time resources.

According to another embodiment, the first ARP 121 is operative for transmitting the first synchronization reference signal in any of a last number of data symbols of the first downlink communication resource before a switch is performed from the first downlink communication resource to a subsequent uplink wireless communication resource.

According to another embodiment, the first ARP 121 is operative for receiving the second synchronization reference signal from the second ARP 122 in any of a last number of data symbols of the second downlink communication resource, and further operative for switching from transmitting mode to receiving mode just before the second synchronization referenced signal is received.

According to another embodiment, the first ARP 121 is operative for transmitting the first synchronization reference signal as a bit sequence derived from a Zadoff-Chu sequence or from a Gold Sequence.

According to other embodiments, the first ARP 121 may further comprise a communication unit 702, which may be considered to comprise conventional means for wireless communication with the wireless communication devices 130, such as a transceiver for wireless transmission and reception of signals. The communication unit 702 may also comprise conventional means for communication with radio access network nodes of the wireless communication network 100, such as the first radio access network node 111. The instructions executable by said processing circuitry 703 may be arranged as a computer program 705 stored e.g. in said memory 704. The processing circuitry 703 and the memory 704 may be arranged in a sub-arrangement 701. The sub-arrangement 701 may be a micro-processor and adequate software and storage therefore, a Programmable Logic Device, PLD, or other electronic component(s)/processing circuit(s) configured to perform the methods mentioned above. The processing circuitry 703 may comprise one or more programmable processor, application-specific integrated circuits, field programmable gate arrays or combinations of these adapted to execute instructions.

The computer program 705 may be arranged such that when its instructions are run in the processing circuitry, they cause the first ARP 121 to perform the steps described in any of the described embodiments of the first ARP 121 and its method. The computer program 705 may be carried by a computer program product connectable to the processing circuitry 703. The computer program product may be the memory 704, or at least arranged in the memory. The memory 704 may be realized as for example a RAM (Random-access memory), ROM (Read-Only Memory) or an EEPROM (Electrical Erasable Programmable ROM). Further, the computer program 705 may be carried by a separate computer-readable medium, such as a CD, DVD or flash memory, from which the program could be downloaded into the memory 704. Alternatively, the computer program may be stored on a server or any other entity to which the first ARP 121 has access via the communication unit 702. The computer program 705 may then be downloaded from the server into the memory 704.

Figure 14:
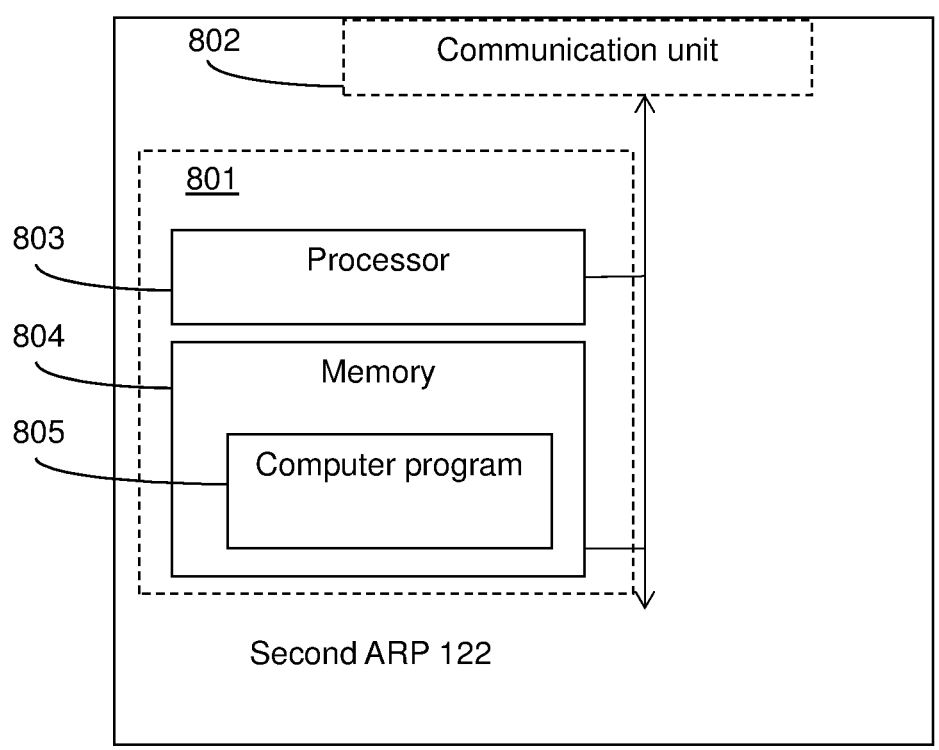
FIG. 14 is a block diagram illustrating a second ARP in more detail, according to further possible embodiments.

FIG. 14, in conjunction with FIG. 2 or FIG. 3, describes an embodiment of a second ARP 122 operative in a wireless communication network 100 for synchronizing transmission of signals from the second ARP 122 and transmission of signals from a first ARP 121 of the wireless communication network. The second ARP 122 comprises a processing circuitry 803 and a memory 804. Said memory contains instructions executable by said processing circuitry, whereby the second ARP 122 is operative for receiving a first synchronization reference signal from the first ARP in a first wireless communication resource, determining a second time point for the reception of the first synchronization signal, and transmitting, to the first ARP 121, a second synchronization reference signal in a second wireless communication resource at a third time point, in response to the reception of the first synchronization reference signal. Further, either the first and the second wireless communication resources are uplink communication resources available to wireless devices for sending uplink data, or the first and the second wireless communication resources are downlink communication resources available to the first or the second ARPs for sending downlink data to the wireless devices. The second ARP is further operative for transmitting signals from the second ARP to the wireless devices at a time point determined based on the second and the third time point, an based on information of time points for, at the first ARP, sending the first synchronization reference signal and receiving the second synchronization reference signal.

According to an embodiment, the wireless communication network 100 is a TDD-based communication network, the first and the second wireless communication resources are downlink communication resources available to the first and the second ARP 121, 122 for sending downlink data to the wireless devices 130, and the first and the second wireless communication resources use a same frequency resource but different time resources.

According to an embodiment, the second ARP 122 is operative for transmitting the second synchronization reference signal in any of a last number of data symbols of the second downlink communication resource before a switch is performed from the second downlink communication resource to a subsequent uplink wireless communication resource.

According to another embodiment, the second ARP 122 is operative for receiving the first synchronization reference signal from the first ARP 121 in any of a last number of data symbols of the first wireless communication resource, and further operative for switching from transmitting mode to receiving mode just before the first synchronization referenced signal is received.

According to another embodiment, the second ARP 122 is operative for transmitting the second synchronization reference signal as a bit sequence derived from a Zadoff-Chu sequence or from a Gold Sequence.

According to other embodiments, the second ARP 122 may further comprise a communication unit 802, which may be considered to comprise conventional means for wireless communication with the wireless communication devices 130, such as a transceiver for wireless transmission and reception of signals. The communication unit 802 may also comprise conventional means for communication with radio access network nodes of the wireless communication network 100, such as the second radio access network node 112. The instructions executable by said processing circuitry 803 may be arranged as a computer program 805 stored e.g. in said memory 804. The processing circuitry 803 and the memory 804 may be arranged in a sub-arrangement 801. The sub-arrangement 801 may be a micro-processor and adequate software and storage therefore, a Programmable Logic Device, PLD, or other electronic component(s)/processing circuit(s) configured to perform the methods mentioned above. The processing circuitry 803 may comprise one or more programmable processor, application-specific integrated circuits, field programmable gate arrays or combinations of these adapted to execute instructions.

The computer program 805 may be arranged such that when its instructions are run in the processing circuitry, they cause the second ARP 122 to perform the steps described in any of the described embodiments of the second ARP 122 and its method. The computer program 805 may be carried by a computer program product connectable to the processing circuitry 803. The computer program product may be the memory 804, or at least arranged in the memory. The memory 804 may be realized as for example a RAM (Random-access memory), ROM (Read-Only Memory) or an EEPROM (Electrical Erasable Programmable ROM). Further, the computer program 805 may be carried by a separate computer-readable medium, such as a CD, DVD or flash memory, from which the program could be downloaded into the memory 804. Alternatively, the computer program may be stored on a server or any other entity to which the second ARP 122 has access via the communication unit 802. The computer program 805 may then be downloaded from the server into the memory 804

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby. In the exemplary figures, a broken line generally signifies that the feature within the broken line is optional.

The invention claimed is:

1. A method performed by a system of a wireless communication network for synchronizing transmission of signals from antenna reference points, ARP, of the wireless communication network, the method comprising:
   initiating transmission of a first synchronization reference signal from a first ARP at a first time point in a first wireless communication resource,
   instructing a second ARP to determine a second time point for reception of the first synchronization reference signal,
   initiating transmission of a second synchronization reference signal from the second ARP at a third time point in a second wireless communication resource, after the second ARP has received the first synchronization reference signal,
   instructing the first ARP to determine a fourth time point for reception of the second synchronization reference signal,
   wherein either the first and the second wireless communication resources are uplink communication resources available to wireless devices for sending uplink data, or the first and the second wireless communication resources are downlink communication resources available to the first or second ARPs for sending downlink data to the wireless devices,
   obtaining information of the second and fourth time points, and
   initiating transmission of data from the first ARP to the wireless devices at a time point determined based on the first, second, third and fourth time points.

2. The method according to claim 1, wherein the wireless communication network is a time-division duplex, TDD, based communication network, the first wireless communication resource is a downlink communication resource available to the first ARP for sending downlink data to the wireless devices, and the second wireless communication resource is a downlink communication resource available to the second ARP for sending downlink data to the wireless devices, and the first and the second wireless communication resources use a same frequency resource but different time resources.

3. The method according to claim 2, wherein the first synchronization reference signal is initiated to be transmitted from the first ARP in any of a last number of data symbols of the first downlink communication resource before a switch from the first downlink communication resource to a subsequent uplink wireless communication resource, or the second synchronization reference signal is initiated to be transmitted from the second ARP in any of a last number of data symbols of the second downlink communication resource before a switch from the second downlink communication resource to a subsequent uplink wireless communication resource.

4. The method according to claim 1, further comprising:
   assigning each of a plurality of ARPs including the first and the second ARP, one of a plurality of transmission group numbers for transmission of synchronization reference signals such that two ARPs of the plurality of ARPs that are within mutual radio coverage are assigned different transmission group numbers, wherein ARPs of the plurality of ARPs that have the same transmission group number are assigned the same time transmission group resource for transmitting synchronization reference signals, and ARPs of the plurality of ARPs having different group numbers are assigned different time transmission group resources for transmitting synchronization reference signals, and
   wherein the initiating of transmission of the first synchronization reference signal and the initiating of transmission of the second synchronization reference signal is performed according to the assigning so that the first and the second synchronization reference signal are transmitted in different time transmission group resources.

5. The method according to claim 4, further comprising:
   assigning each of the plurality of ARPs one of a plurality of transmission channels for the transmission of synchronization reference signals, such that ARPs of the plurality of ARPs that are assigned the same transmission group but are to transmit synchronization reference signals to the same ARP are assigned different transmission channels, wherein the initiating of transmissions of the first synchronization reference signal and the initiating of transmission of a third synchronization reference signal from a third ARP that is assigned the same transmission group as the first ARP is performed according to the assigning so that the first and the third synchronization reference signal are transmitted in different transmission channels.

6. A method performed by a first antenna reference point, ARP, of a wireless communication network for synchronizing transmission of signals from the first ARP and transmission of signals from a second ARP of the wireless communication network, the method comprising:

transmitting a first synchronization reference signal at a first time point in a first wireless communication resource;

receiving a second synchronization reference signal from the second ARP in a second wireless communication resource, in response to the transmission of the first synchronization reference signal;

determining a fourth time point for the reception of the second synchronization signal, wherein either the first and the second wireless communication resources are uplink communication resources available to wireless devices for sending uplink data, or the first and the second wireless communication resources are downlink communication resources available to the first or second ARPs for sending downlink data to the wireless devices, and transmitting signals from the first ARP to the wireless devices at a time point determined based on the first and the fourth time point, and based on information of time points for, at the second ARP, receiving the first synchronization reference signal and sending the second synchronization reference signal.

7. The method according to claim 6, wherein the wireless communication network is a time-division duplex, TDD, based communication network, the first and the second wireless communication resources are downlink communication resources available to the first and the second ARP for sending downlink data to the wireless devices, and the first and the second wireless communication resources use a same frequency resource but different time resources.

8. The method according to claim 7, wherein the first synchronization reference signal is transmitted in any of a last number of data symbols of the first downlink communication resource before a switch is performed from the first downlink communication resource to a subsequent uplink wireless communication resource.

9. The method according to claim 7, wherein the second synchronization reference signal is received from the second ARP in any of a last number of data symbols of the second downlink communication resource, the method further comprising:

switching from transmitting mode to receiving mode just before the second synchronization reference signal is received.

10. The method according to claim 6, further comprising: receiving information of the first time point from a system of the communication network.

11. The method according to claim 6, wherein the second wireless communication resource is known at the first ARP.

12. The method according to claim 6, wherein the first synchronization reference signal is transmitted as a bit sequence derived from a Zadoff-Chu sequence or from a Gold Sequence.

13. The method according to claim 6, further comprising: receiving an instruction from a system of the communication network to determine the fourth time point.

14. A method performed by a second antenna reference point, ARP, of a wireless communication network for synchronizing transmission of signals from the second ARP and transmission of signals from a first ARP of the wireless communication network, the method comprising:

receiving a first synchronization reference signal from the first ARP in a first wireless communication resource;

determining a second time point for the reception of the first synchronization signal, and transmitting, to the first ARP, a second synchronization reference signal in a second wireless communication resource at a third time point, in response to the reception of the first synchronization reference signal, wherein either the first and the second wireless communication resources are uplink communication resources available to wireless devices for sending uplink data, or the first and the second wireless communication resources are downlink communication resources available to the first or the second ARPs for sending downlink data to the wireless devices, and transmitting signals from the second ARP to the wireless devices at a time point determined based on the second and the third time point, and based on information of time points for, at the first ARP, sending the first synchronization reference signal and receiving the second synchronization reference signal.

15. The method according to claim 14, wherein the wireless communication network is a time-division duplex, TDD, based communication network, the first and the second wireless communication resources are downlink communication resources available to the first and the second ARP for sending downlink data to the wireless devices, and the first and the second wireless communication resources use a same frequency resource but different time resources.

16. The method according to claim 15, wherein the second synchronization reference signal is transmitted-40€4 in any of a last number of data symbols of the second downlink communication resource before a switch is performed from the second downlink communication resource to a subsequent uplink wireless communication resource.

17. The method according to claim 15, wherein the first synchronization reference signal is received from the first ARP in any of a last number of data symbols of the first wireless communication resource, the method further comprising:

switching from transmitting mode to receiving mode just before the first synchronization referenced signal is received.

18. The method according to claim 14, further comprising:

receiving information of the third time point from a system of the communication network.

19. The method according to claim 14, wherein the first wireless communication resource is known at the second ARP.

20. The method according to claim 14, wherein the second synchronization reference signal is transmitted as a bit sequence derived from a Zadoff-Chu sequence or from a Gold Sequence.

21. The method according to claim 14, further comprising:

receiving an instruction from a system of the communication network to determine the second time point.

22. A system operable in a wireless communication network for synchronizing transmission of signals from antenna reference points, ARP, of the wireless communication network, the system comprising a processing circuitry and a memory, said memory containing instructions executable by said processing circuitry, whereby the system is operative for:

initiating transmission of a first synchronization reference signal from a first ARP at a first time point in a first wireless communication resource, instructing a second ARP to determine a second time point for reception of the first synchronization reference signal, initiating transmission of a second synchronization reference signal from the second ARP at a third time point in a second wireless communication resource, after the second ARP has received the first synchronization reference signal, instructing the first ARP to determine a fourth time point for reception of the second synchronization reference signal, wherein either the first and the second wireless communication resources are uplink communication resources available to wireless devices for sending uplink data, or the first and the second wireless communication resources are downlink communication resources available to the first or second ARPs for sending downlink data to the wireless devices, obtaining information of the second and fourth time points, and initiating transmission of data from the first ARP to the wireless devices at a time point determined based on the first, second, third and fourth time points.

23. The system according to claim 22, further being operative for:

assigning each of a plurality of ARPs including the first and the second ARP, one of a plurality of transmission group numbers for transmission of synchronization reference signals such that two ARPs of the plurality of ARPs that are within mutual radio coverage are assigned different transmission group numbers, wherein ARPs of the plurality of ARPs that have the same transmission group number are assigned the same time transmission group resource for transmitting synchronization reference signals, and ARPs of the plurality of ARPs having different group numbers are assigned different time transmission group resources for transmitting synchronization reference signals, and wherein the system is operative for the initiation of transmission of the first synchronization reference signal and the initiation of transmission of the second synchronization reference signal according to the assigning so that the first and the second synchronization reference signal are transmitted in different time transmission group resources.

24. The system according to claim 23, further being operative for:

assigning each of the plurality of ARPs one of a plurality of transmission channels for the transmission of synchronization reference signals, such that ARPs of the plurality of ARPs that are assigned the same transmission group but are to transmit synchronization reference signals to the same ARP are assigned different transmission channels, wherein the initiating of transmission of the first synchronization reference signal and the initiating of transmission of a third synchronization reference signal from a third ARP that is assigned the same transmission group as the first ARP is performed according to the assigning so that the first and the third synchronization reference signal are transmitted in different transmission channels.

25. A first antenna reference point, ARP, operable in a wireless communication network for synchronizing transmission of signals from the first ARP and transmission of signals from a second ARP of the wireless communication network, the first ARP comprising a processing circuitry and a memory, said memory containing instructions executable by said processing circuitry, whereby the first ARP is operative for:

transmitting a first synchronization reference signal at a first time point in a first wireless communication resource;

receiving a second synchronization reference signal from the second ARP in a second wireless communication resource, in response to the transmission of the first synchronization reference signal;

determining a fourth time point for the reception of the second synchronization signal, wherein either the first and the second wireless communication resources are uplink communication resources available to wireless devices for sending uplink data, or the first and the second wireless communication resources are downlink communication resources available to the first or second ARPs for sending downlink data to the wireless devices, and transmitting signals from the first ARP to the wireless devices at a time point determined based on the first and the fourth time point, and based on information of time points for, at the second ARP, receiving the first synchronization reference signal and sending the second synchronization reference signal.

26. The first ARP according to claim 25, wherein the wireless communication network is a TDD-based communication network, the first and the second wireless communication resources are downlink communication resources available to the first and the second ARP for sending downlink data to the wireless devices, and the first and the second wireless communication resources use a same frequency resource but different time resources.

27. The first ARP according to claim 26, operative for transmitting the first synchronization reference signal in any of a last number of data symbols of the first downlink communication resource before a switch is performed from the first downlink communication resource to a subsequent uplink wireless communication resource.

28. The first ARP according to claim 26, operative for receiving the second synchronization reference signal from the second ARP in any of a last number of data symbols of the second downlink communication resource, and further operative for switching from transmitting mode to receiving mode just before the second synchronization referenced signal is received.

29. The first ARP according to claim 25, operative for transmitting the first synchronization reference signal as a bit sequence derived from a Zadoff-Chu sequence or from a Gold Sequence.

30. A Second ARP operative in a wireless communication network for synchronizing transmission of signals from the second ARP and transmission of signals from a first ARP of the wireless communication network, the second ARP comprising a processing circuitry and a memory, said memory containing instructions executable by said processing circuitry, whereby the second ARP is operative for:

receiving a first synchronization reference signal from the first ARP in a first wireless communication resource;

determining a second time point for the reception of the first synchronization signal;

transmitting, to the first ARP, a second synchronization reference signal in a second wireless communication resource at a third time point, in response to the reception of the first synchronization reference signal, wherein either the first and the second wireless communication resources are uplink communication resources available to wireless devices for sending uplink data, or the first and the second wireless communication resources are downlink communication resources available to the first or the second ARPs for sending downlink data to the wireless devices, and transmitting signals from the second ARP to the wireless devices at a time point determined based on the second and the third time point, and based on information of time points for, at the first ARP, sending the first synchronization reference signal and receiving the second synchronization reference signal.

31. The second ARP according to claim 30, wherein the wireless communication network is a TDD-based communication network, the first and the second wireless communication resources are downlink communication resources available to the first and the second ARP for sending downlink data to the wireless devices, and the first and the second wireless communication resources use a same frequency resource but different time resources.

32. The second ARP according to claim 31, operative for transmitting the second synchronization reference signal in any of a last number of data symbols of the second downlink communication resource before a switch is performed from the second downlink communication resource to a subsequent uplink wireless communication resource.

33. The second ARP according to claim 31, operative for receiving the first synchronization reference signal from the first ARP in any of a last number of data symbols of the first wireless communication resource, and further operative for switching from transmitting mode to receiving mode just before the first synchronization referenced signal is received.

34. The second ARP according to claim 30, operative for transmitting the second synchronization reference signal as a bit sequence derived from a Zadoff-Chu sequence or from a Gold Sequence.

35. A computer program comprising instructions, which, when executed by at least one processing circuitry of a system of a wireless communication network, configured for synchronizing transmission of signals from ARPs of the wireless communication network, causes the system to perform the following steps:
  initiating transmission of a first synchronization reference signal from a first ARP at a first time point in a first wireless communication resource,
  instructing a second ARP to determine a second time point for reception of the first synchronization reference signal,
  initiating transmission of a second synchronization reference signal from the second ARP at a third time point in a second wireless communication resource, after the second ARP has received the first synchronization reference signal,
  instructing the first ARP to determine a fourth time point for reception of the second synchronization reference signal,
  wherein either the first and the second wireless communication resources are uplink communication resources available to wireless devices for sending uplink data, or the first and the second wireless communication resources are downlink communication resources available to the first or second ARPs for sending downlink data to the wireless devices,
  obtaining information of the second and fourth time points, and
  initiating transmission of data from the first ARP to the wireless devices at a time point determined based on the first, second, third and fourth time points.

36. A non-transitory computer readable storage medium containing the computer program according to claim 35.

37. A computer program comprising instructions, which, when executed by at least one processing circuitry of a first ARP of a wireless communication network, configured for synchronizing transmission of signals from the first ARP and transmission of signals from a second ARP of the wireless communication network, causes the first ARP to perform the following steps:
  transmitting a first synchronization reference signal at a first time point in a first wireless communication resource;
  receiving a second synchronization reference signal from the second ARP in a second wireless communication resource, in response to the transmission of the first synchronization reference signal;
  determining a fourth time point for the reception of the second synchronization signal, wherein either the first and the second wireless communication resources are uplink communication resources available to wireless devices for sending uplink data, or the first and the second wireless communication resources are downlink communication resources available to the first or second ARPs for sending downlink data to the wireless devices, and
  transmitting signals from the first ARP to the wireless devices at a time point determined based on the first and the fourth time point, and based on information of time points for, at the second ARP, receiving the first synchronization reference signal and sending the second synchronization reference signal.

38. A non-transitory computer readable storage medium containing the computer program according to claim 37.

39. A computer program comprising instructions, which, when executed by at least one processing circuitry of a second ARP of a wireless communication network, configured for synchronizing transmission of signals from the second ARP and transmission of signals from a first ARP of the wireless communication network, causes the second ARP to perform the following steps:
  receiving a first synchronization reference signal from the first ARP in a first wireless communication resource;
  determining a second time point for the reception of the first synchronization signal;
  transmitting, to the first ARP, a second synchronization reference signal in a second wireless communication resource at a third time point, in response to the reception of the first synchronization reference signal, wherein either the first and the second wireless communication resources are uplink communication resources available to wireless devices for sending uplink data, or the first and the second wireless communication resources are downlink communication resources available to the first or the second ARPs for sending downlink data to the wireless devices, and
  transmitting signals from the second ARP to the wireless devices at a time point determined based on the second and the third time point, an based on information of time points for, at the first ARP, sending the first synchronization reference signal and receiving the second synchronization reference signal.

40. A non-transitory computer readable storage medium containing the computer program according to claim 39.

* * * * *